United States Patent [19]

Terajima et al.

[11] Patent Number: 5,544,234

[45] Date of Patent: Aug. 6, 1996

[54] FACSIMILE APPARATUS WITH AUTOMATIC ANSWERING TELEPHONE FUNCTION, AND COMMUNICATION METHOD IN SAID APPARATUS

[75] Inventors: Hisao Terajima, Yokohama; Shigeru Koizumi, Urawa; Toru Nakayama, Yokohama; Tomoyuki Takeda, Yokohama; Hiromichi Uno, Yokohama; Kaori Nakagawa; Hideki Shimizu, both of Kawasaki; Mitsuo Morita, Tokyo, all of Japan

[73] Assignee: Canon Kabushiki Kaisha, Tokyo, Japan

[21] Appl. No.: 479,860

[22] Filed: Jun. 7, 1995

Related U.S. Application Data

[63] Continuation of Ser. No. 266,106, Jun. 27, 1994, abandoned, which is a continuation of Ser. No. 937,675, Sep. 1, 1992, abandoned.

[30] Foreign Application Priority Data

| Sep. 4, 1991 | [JP] | Japan | 3-224217 |
| Nov. 14, 1991 | [JP] | Japan | 3-298989 |
| Nov. 19, 1991 | [JP] | Japan | 3-303278 |
| Feb. 26, 1992 | [JP] | Japan | 4-075276 |
| Apr. 28, 1992 | [JP] | Japan | 4-136343 |
| Jun. 19, 1992 | [JP] | Japan | 4-186368 |

[51] Int. Cl.$^6$ .................. H04M 11/00; H04M 1/64
[52] U.S. Cl. .................. 379/100; 379/97; 379/93; 379/88; 379/89
[58] Field of Search .................. 379/100, 93, 96, 379/97, 98, 94, 88, 89; 358/400, 440, 468, 435, 442

[56] References Cited

U.S. PATENT DOCUMENTS

| 4,677,660 | 6/1987 | Yoshida | 379/100 |
| 4,800,439 | 1/1989 | Yoshino | 358/257 |
| 4,815,121 | 3/1989 | Yoshida | 379/67 |
| 4,868,865 | 9/1989 | Ogawa et al. | 379/100 |
| 4,916,607 | 4/1990 | Teraichi et al. | 379/100 |
| 4,932,048 | 6/1990 | Kenomochi et al. | 379/67 |
| 5,065,427 | 11/1991 | Godbole | 379/100 |
| 5,151,972 | 9/1992 | Lorenz et al. | 379/100 |

*Primary Examiner*—Jason Chan
*Attorney, Agent, or Firm*—Fitzpatrick, Cella, Harper & Scinto

[57] ABSTRACT

Disclosed is a facsimile apparatus equipped with an automatic answering telephone function, as well as a communication method in this apparatus. When a tone signal from a line is detected after the start of storage of a voice message in response to an incoming call, the voice message presently being recorded is not counted as a received message and a voice message received next is stored in the area in which storage has just been performed. Further, when a DTMF signal, which is a control signal of the automatic answering telephone, is detected, a transition is made to facsimile communication in response to a CNG signal. Thus, erroneous operation in facsimile communication due to a CNG signal recorded in the automatic answering telephone is prevented.

33 Claims, 29 Drawing Sheets

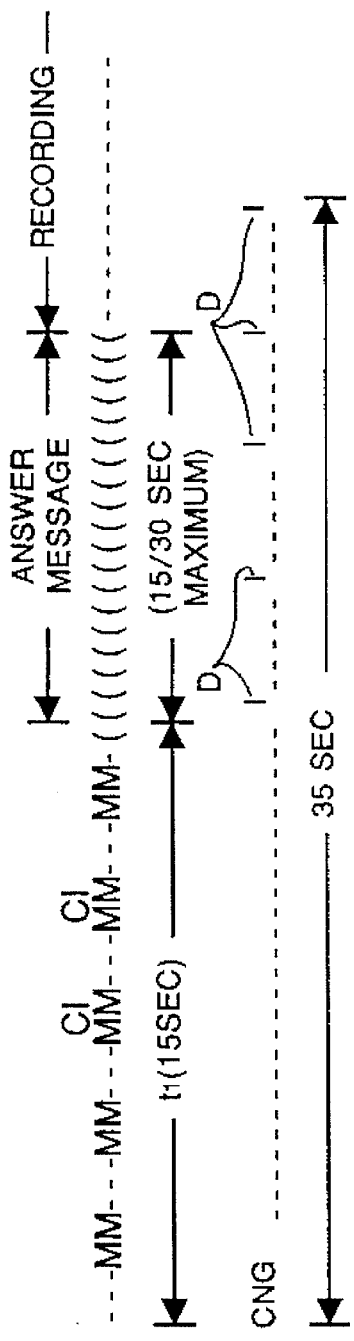
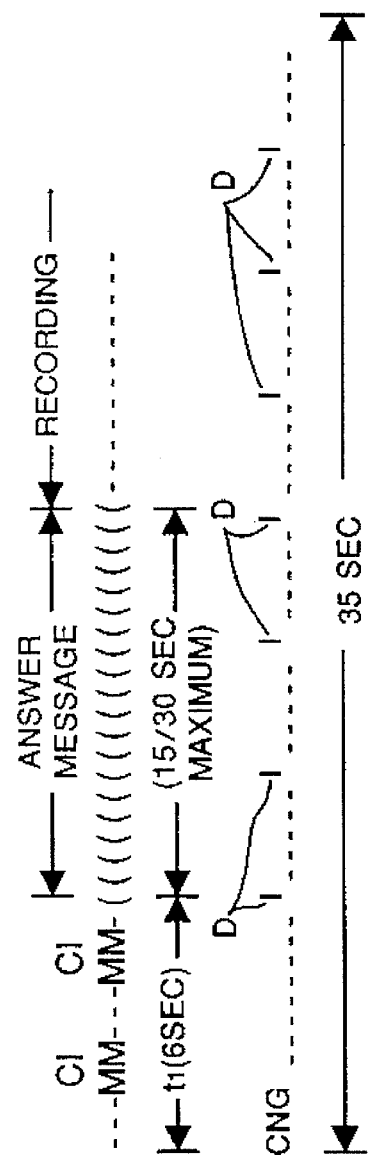
FIG. 21A
FIG. 21B

FACSIMILE APPARATUS WITH AUTOMATIC ANSWERING TELEPHONE FUNCTION, AND COMMUNICATION METHOD IN SAID APPARATUS

This application is a continuation of application Ser. No. 08/266,106 filed Jun. 27, 1994, now abandoned, which is a continuation of application Ser. No. 07/937,675 filed Sep. 1, 1992, now abandoned.

BACKGROUND OF THE INVENTION

1. Field of the Invention

This invention relates to a facsimile apparatus having an automatic answering telephone function, in which the apparatus has an automatic answering telephone connected thereto and is capable of changing over automatically between the facsimile mode and the automatic answering telephone. The invention further relates to a communication method in this apparatus.

2. Description of the Prior Art

An example of a conventional facsimile communication apparatus to which an automatic answering telephone set is connected is one having an automatic changeover function (TEL/FAX automatic changeover function) for changing over between a telephone mode and a facsimile mode automatically. An NCU (network control unit) in an apparatus of this kind is constructed as shown in FIG. 6. In FIG. 6, terminals L1 and L2 are connected to a line N. An automatic answering telephone 16 is connected to terminals T1 and T2. The automatic answering telephone 16 automatically answers a call signal from the line N. If the calling party is a human being, a voice message from this party is recorded. When the calling party is a facsimile machine, a CNG signal sent by the facsimile machine of the calling party enters a CNG detector 7 through a capacitor 5 and a transformer 6. The CNG detector 7 outputs a CNG detection signal (CNGDET) when it detects the CNG signal. When the CNGDET signal is outputted, the control unit performs automatic communication by changing over a CML relay 1 from the side of T1, T2 to the side of a modem. Thus, when the CNG signal is detected on the line after the automatic answering telephone has answered automatically, the CML relay 1 is changed over, thereby realizing automatic changeover between the automatic answering telephone and the facsimile mode.

More specifically, when there is an incoming call from the line in a state in which the automatic answering telephone has been set to the automatic answering mode in the facsimile communication apparatus of this type, first the automatic answering telephone is started and the line is connected to the side of the automatic answering telephone to playback a pre-recorded answer message (an outgoing message, also referred to as an "OGM") and send this message to the calling side. In parallel with this operation, the signal received from the line is monitored. When the CNG signal (1100 Hz) is detected, as mentioned above, it is determined that the calling side is a facsimile machine and the line is changed over from the side of the automatic answering telephone to the modem side of the facsimile communication apparatus, after which facsimile communication is carried out.

The aforementioned detection of the CNG signal is performed by using a band-pass filter to extract a frequency component of 1100 Hz from the signal inputted by the line.

A problem is encountered in the prior art described above. Specifically, since the operation for sending the answer message is performed in parallel with the detection of the CNG signal and the level of the answer message is higher than the level of the CNG signal, detection of the CNG signal by the above-mentioned bandpass filter is hindered and the TEL/FAX automatic changeover function can operate erroneously.

In order to prevent this erroneous operation, an expedient is to set a fixed silent period, which is for the purpose of preventing collision with the CNG signal, when the answer message is recorded. However, the setting operation is a troublesome one.

Furthermore, in order to change over the CML relay 1 after the CNG signal is confirmed, as mentioned above, the CNG signal is recorded more than one time in the automatic answering telephone. Alternatively, since detection of the CNG signal cannot be performed well during transmission of the answer message, as set forth above, there are cases where the operation of the telephone mode proceeds and the operation for recording the message from the calling party by the automatic answering telephone is initiated. In such case, the CNG signal sent in continuous fashion will be recorded in the automatic answering telephone in the area thereof that is for recording the message from the calling party. If the CNG signal happens to be recorded in this manner and the owner of the facsimile communication apparatus attempts to listen to the recorded contents of a message from a calling party as by a remote control operation from an outside telephone using DTMF or the like, the message when played back will contain the CNG signal. Owing to the CNG signal played back in this manner, the TEL/FAX automatic changeover function will operate erroneously and the apparatus will be changed over to the facsimile mode.

SUMMARY OF THE INVENTION

Accordingly, an object of the present invention is to provide a facsimile apparatus having an automatic answering telephone function, as well as a communication method in this apparatus, in which detection of a tone signal for TEL/FAX automatic changeover is capable of being performed properly irrespective of transmission of an answer message by the automatic answering telephone.

Another object of the present invention is to provide a facsimile apparatus having an automatic answering telephone function, as well as a communication method in this apparatus, in which no transition is made to a facsimile reception operation if a remote-control signal, which is for remote control of a communication terminal such as an automatic answering telephone, is detected.

Still another object of the present invention is to provide a facsimile apparatus having an automatic answering telephone function, as well as a communication method in this apparatus, in which it is possible to prevent wasteful consumption of message recording capacity owing to recording of a tone signal for facsimile identification, as well as erroneous operation on the side of the facsimile apparatus due to playback of a tone signal.

A further object of the present invention is to provide a facsimile apparatus having an automatic answering telephone function, as well as a communication method in this apparatus, in which, when an automatic answering telephone is made to perform remote playback, for example, it is possible to prevent a facsimile operation from being started by a facsimile-related signal contained in the reproduced sound.

Yet another object of the present invention is to provide a facsimile apparatus having an automatic answering telephone function, as well as a communication method in this apparatus, in which a tone signal is prevented from being recorded along with a message.

Another object of the present invention is to provide a facsimile apparatus having an automatic answering telephone function, as well as a communication method in this apparatus, in which a CNG signal can be detected without affecting an answer message sent from the automatic answering telephone.

According to the present invention, the foregoing objects are attained by providing a facsimile apparatus to which a communication terminal which performs predetermined communication is capable of being connected, comprising first detecting means for detecting whether a calling party is a facsimile apparatus or not, second detecting means for detecting whether a received signal contains a control signal for controlling the communication terminal, control means for starting facsimile communication in accordance with a detection signal from the first detecting means indicating that the calling party is a facsimile apparatus, and inhibiting means for inhibiting transition to facsimile communication when the control signal is detected by the second detecting means.

According to another aspect of the present invention, a facsimile apparatus with an automatic answering telephone function comprises voice-message storing means for storing a voice message inputted from a line, tone-signal detecting means for detecting a tone signal from the line, message erasing means for erasing the message stored in the voice-message storing means, and control means for performing control in such a manner that when the tone signal is detected by the tone-signal detecting means after the voice-message storing means has started, the message stored in the voice-message storing means_after the voice-message storing means has started is erased, and then, when a voice message subsequently inputted is stored, this message is stored in a storage area that was just erased.

According to the present invention, the foregoing objects are attained by providing a communication method in a facsimile apparatus with an automatic answering telephone function, wherein the facsimile apparatus is connected to a line along with an automatic answering telephone and either automatic voice communication by the automatic answering telephone or image communication at the time of an incoming call is selectively executed automatically, the method comprising a step of connecting the line to the automatic answering telephone or to image communication means, a step of detecting a control signal specific to image communication connected to a line on the side of the automatic answering telephone, a step of starting recording when a signal indicative of start of recording of a calling party's message in the automatic answering telephone is detected, and a step of sending a DTMF signal to the automatic answering telephone when the control signal is detected at the time of recording of the calling party's message.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 21 is a timing chart for describing incoming-call control in the facsimile apparatus according to the sixth embodiment;

DESCRIPTION OF THE PREFERRED EMBODIMENTS

Preferred embodiments of the present invention will now be described in detail with reference to the accompanying drawings.

Figure 1:
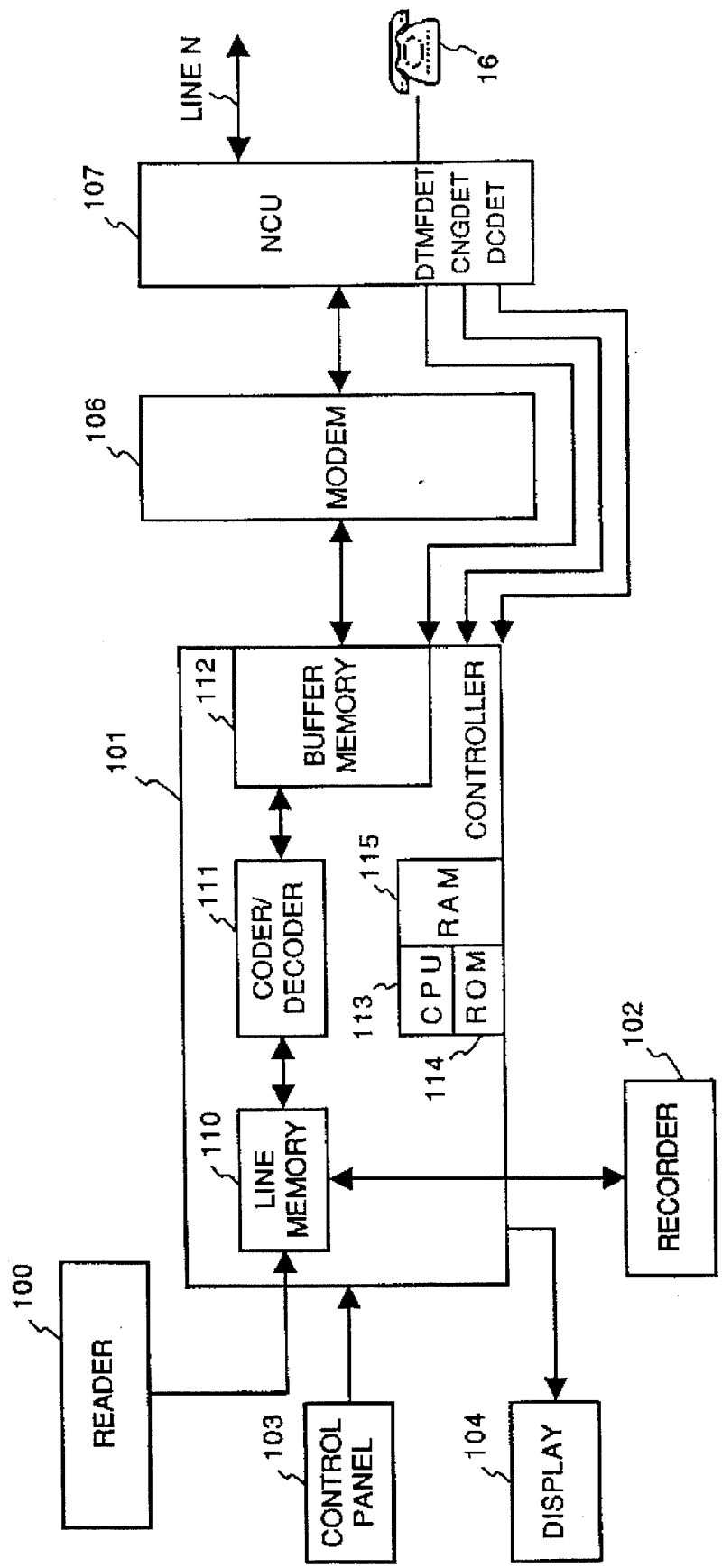
FIG. 1 is a block diagram showing the construction of a facsimile apparatus according to a first embodiment of the present invention.

FIG. 1 is a block diagram illustrating the construction of a facsimile apparatus according to a first embodiment of the invention. In FIG. 1, the facsimile apparatus includes a controller 101 constituted by a microprocessor or the like and comprising a CPU (central processing unit) 113, a ROM (read-only memory) 114, a RAM (random-access memory) 115, a buffer memory 112, a line memory 110 and a coder/decoder 111. The controller 101 controls image input/output and overall communication processing, the ROM 114 stores a control program, described below, and the RAM 115 is used as a working area of the CPU 113.

Input/output of image data is performed by a reader 100 and a recorder 102. More specifically, the reading of image data indicative of an original is performed by the reader 100, which comprises a CCD (charge-coupled device) sensor, an original conveying mechanism, etc. Data indicative of a received image or image data read by the reader 100 when a copy is made are recorded by the recorder 102, which comprises a thermosensitive printer, an ink-jet printer or the like.

The input/output of image data between the reader 100 and the coder/decoder 111 as well as between the recorder 102 and the coder/decoder is performed via the line memory 110, which stores data in units of one line. The input/output of data between the coder/decoder 111 and a modem 106 is performed via a buffer memory 112. The coder/decoder 111, which executes coding/decoding processing in order to suppress redundancy, may be constituted by the software of the CPU 113.

The connection with a communication line N such as a telephone line and the input and output of data are carried out by the modem 106 and an NCU (network control unit) 107. A telephone for communication and manual control or an automatic answering telephone 16 is connected to the NCU 107. The NCU 107 outputs a DCDET signal which indicates that the automatic answering telephone 16 has acquired a line, a CNGDET signal indicating that there is a CNG signal on the line, and a DTMFDET signal which indicates that there is a DTMF signal on the line. These signals enter the controller 101.

A control panel 103 includes numeric keys for inputting a telephone number, and various function keys, etc. The control panel 103 is provided with a display unit 104 used for displaying telephone numbers, time, etc.

Figure 2:
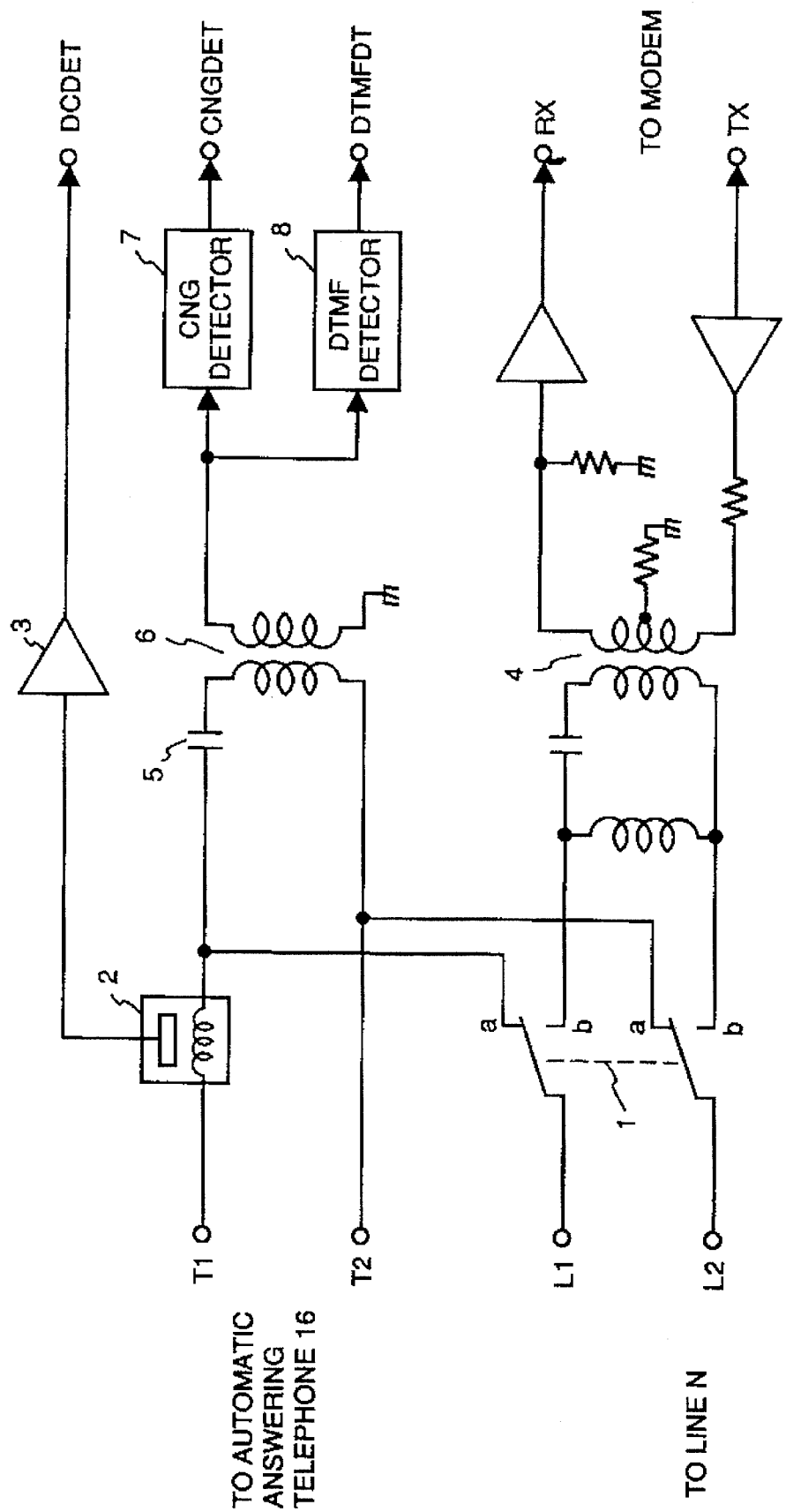
FIG. 2 is a block diagram showing the construction of an NCU in the facsimile apparatus of this embodiment.
Figure 6:
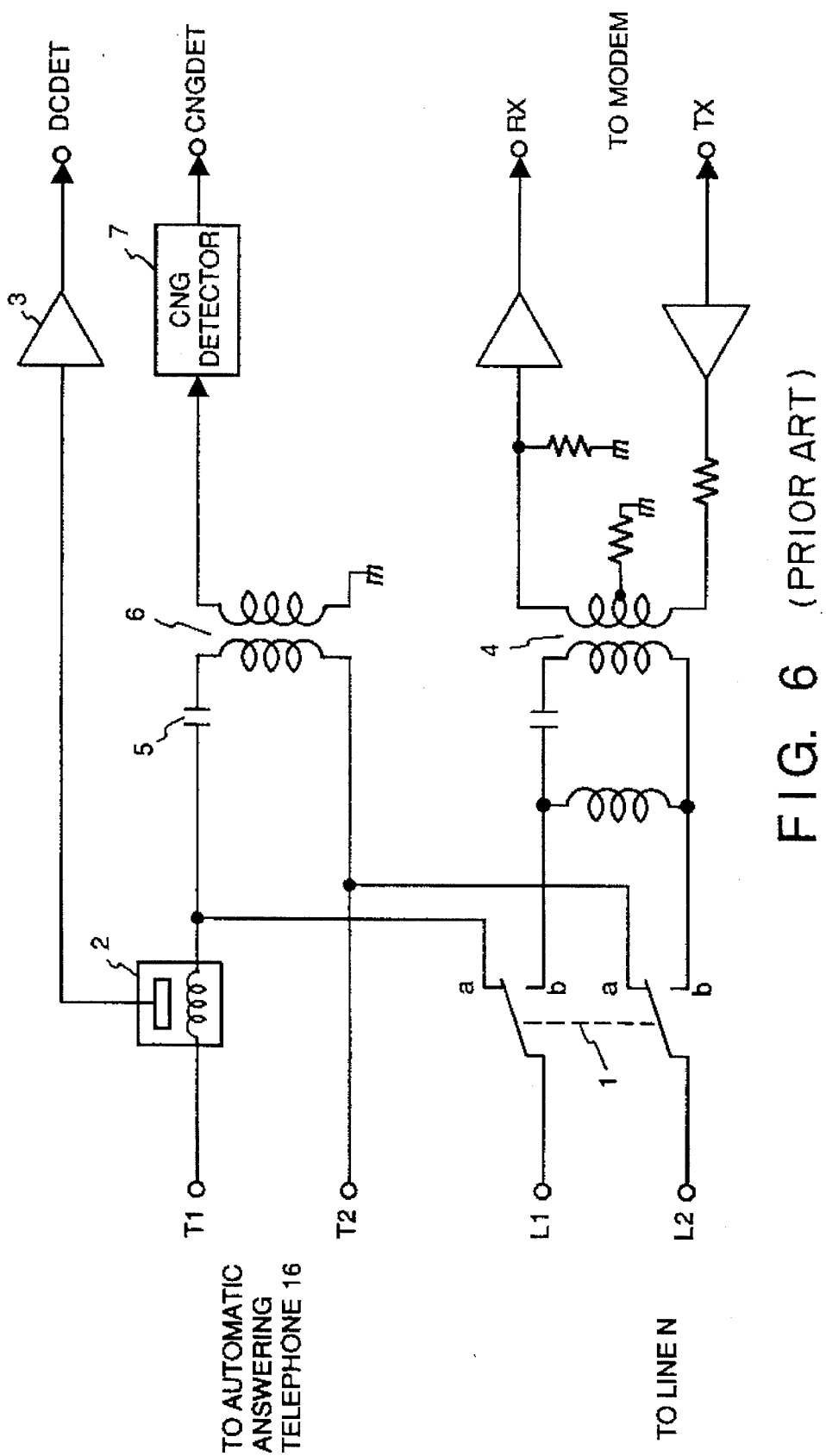
FIG. 6 is a block diagram showing the construction of an NCU according to the prior art.

FIG. 2 is a diagram showing the construction of the NCU 107 of this embodiment. Portions corresponding to those in the conventional NCU shown in FIG. 6 are designated by like reference characters and need not be described again.

In FIG. 2, numeral 1 denotes the CML relay and numeral 2 denotes a current sensor which comprises a coil and a Hall device or an MR device provided in the proximity of the coil and insulated therefrom. A magnetic field produced by a current passed through the coil is detected by the Hall device or MR device, whereby a voltage output proportional to the coil current is obtained. The output of the current sensor 2 enters a comparator 3, from which the DCDET signal indicating whether there is a current is outputted. The DCDET signal is outputted to the controller 101.

The capacitor 5 blocks direct current, the transformer 7 transmits the CNG signal and DTFM signal to the CNG detector 7 and DTMF detector 8, respectively. The CNG detector 7 outputs the CNGDET signal to the controller 101 upon detecting the CNG signal. The DTMF detector 8 outputs the DTMF detection DTMFDET signal to the controller 101 upon detecting the DTMF signal. Numeral 4 denotes a transformer for transmitting a facsimile signal and performing a two-line/four-line conversion.

Figure 3:
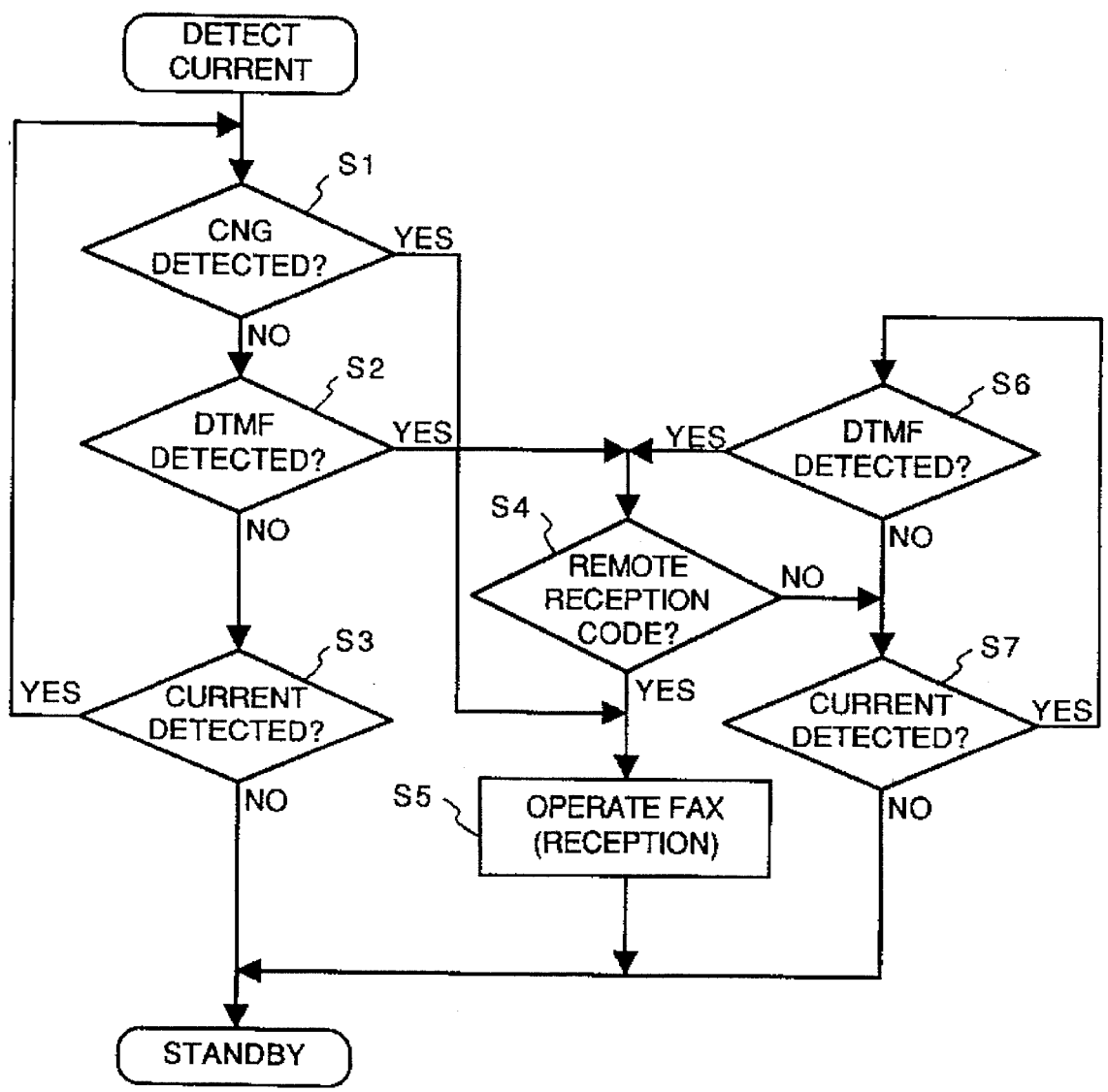
FIG. 3 is a flowchart showing a receiving operation performed by the facsimile apparatus of this embodiment.

Operation for remote reception in the foregoing arrangement will now be described based upon the flowchart of FIG. 3. The control program run by the controller 101 (CPU 113) to monitor and control in accordance with the flowchart of FIG. 3 is stored in the ROM 114.

First, in the standby state, the controller 101 monitors the DCDET signal. When the automatic answering telephone 16 automatically answers a call signal from the line, a direct current flows into the current sensor 2 and the comparator 6 outputs the DCDET signal. Upon sensing this signal, the controller 101 causes the control program to proceed to step S1. When the calling party causes the automatic answering telephone 16 to store a message, neither the CNG signal nor the DTMF signal arrive and therefore the program proceeds to step S2 and then to step S3. The DCDET signal is monitored at step S3. When a line current is flowing, the program returns from step S3 to step S1, after which the loop of steps S1~S3 is executed. When the line is cut, the system returns to the standby mode from step S3.

If the calling side is a facsimile machine, the CNG signal is transmitted and therefore this signal is detected at step S1, whence the program proceeds to step S5 in order that a facsimile operation is performed. At this step the CML relay 1 is changed over from the a side to the b side so that facsimile communication is performed.

When the calling side sends the DTMF signal in order to remotely control the automatic answering telephone 16, this is detected at step S2 and the program proceeds to step S4. At this step, the code of the received DTMF signal is compared with a code, which has been stored beforehand in the RAM 115, designating remote reception of the facsimile transmission. If these codes agree, the program proceeds to step S5 and the reception operation is carried out. If the codes do not agree, however, the program proceeds to step S7 since the received DTMF signal is for controlling the automatic answering telephone 16. Detection of the DTMF signal and detection of current are performed by the loop consisting of steps S7~S6. When the DTMF signal is received, the program proceeds to step S4 again so that a check of remote reception is performed. When the DCDET signal is no longer detected and current is no longer detected at step S7, the system returns to the standby state.

It should be noted that the code which designates remote reception is registered (stored) in the RAM 115 by means similar to means for registering telephone numbers that are for the purpose of automatically dialing facsimile machines. Further, the facsimile operation is not limited to a reception operation but can be any facsimile operation such as transmission, copying, output of a communication management report, etc.

Thus, as described above, once the DTMF signal is detected, the processing of loops of steps S7~S6 is executed. As a result, detection of the CNG signal is not longer carried out and CNG signal detection is not performed until the line is cut. Accordingly, even if the sound reproduced by the automatic answering telephone 16 contains the CNG signal, there is no changeover to facsimile reception and the facsimile reception operation is not performed. Further, by having the user register a code, which differs from the DTMF code for controlling the automatic answering telephone 16, as a code for remote operation of the facsimile, the facsimile can be remotely operated after remotely controlling the automatic answering telephone 16.

Figure 4:
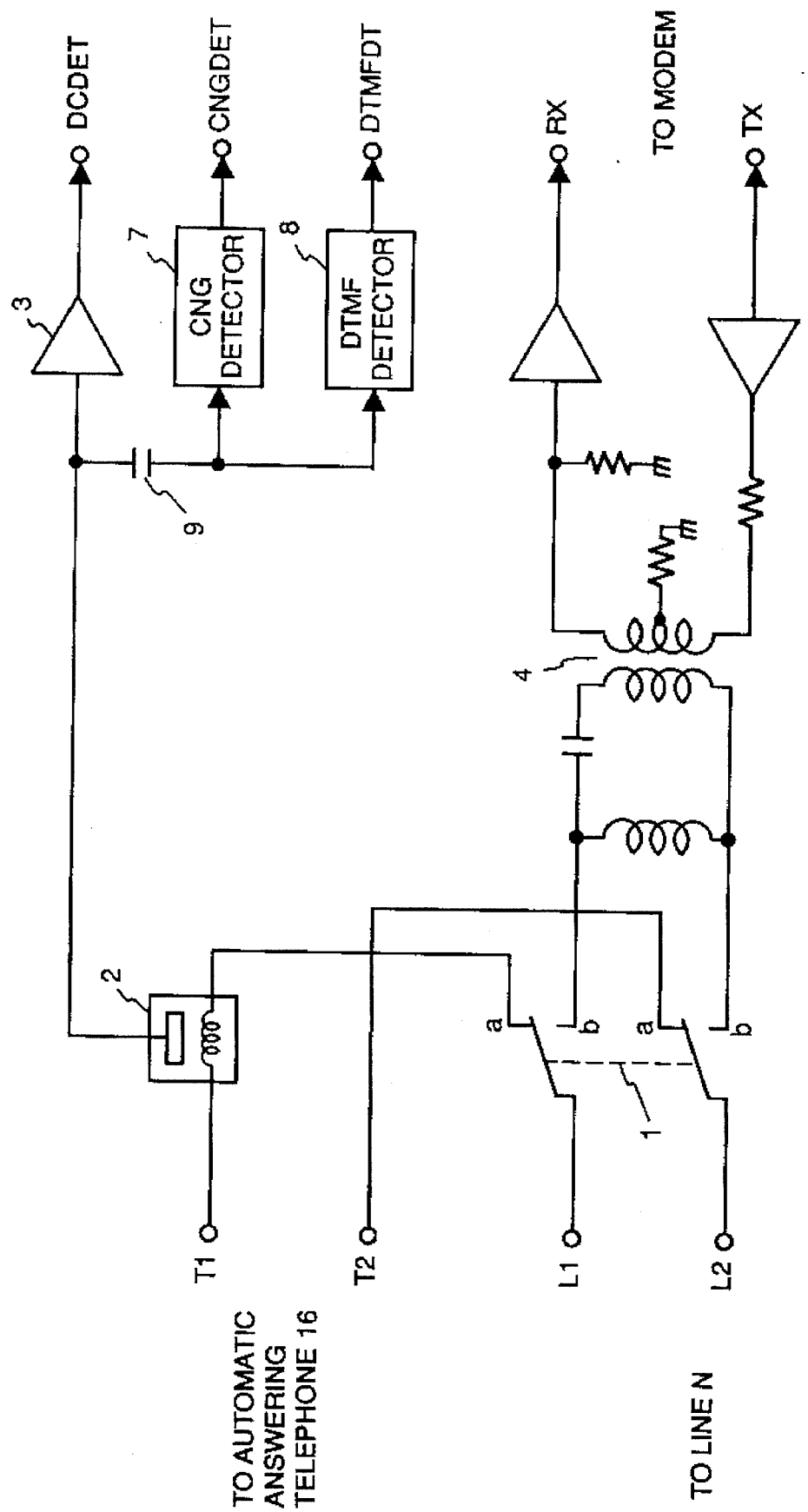
FIG. 4 is a block diagram showing the construction of a modification of the NCU in the first embodiment of this invention.
Figure 5:
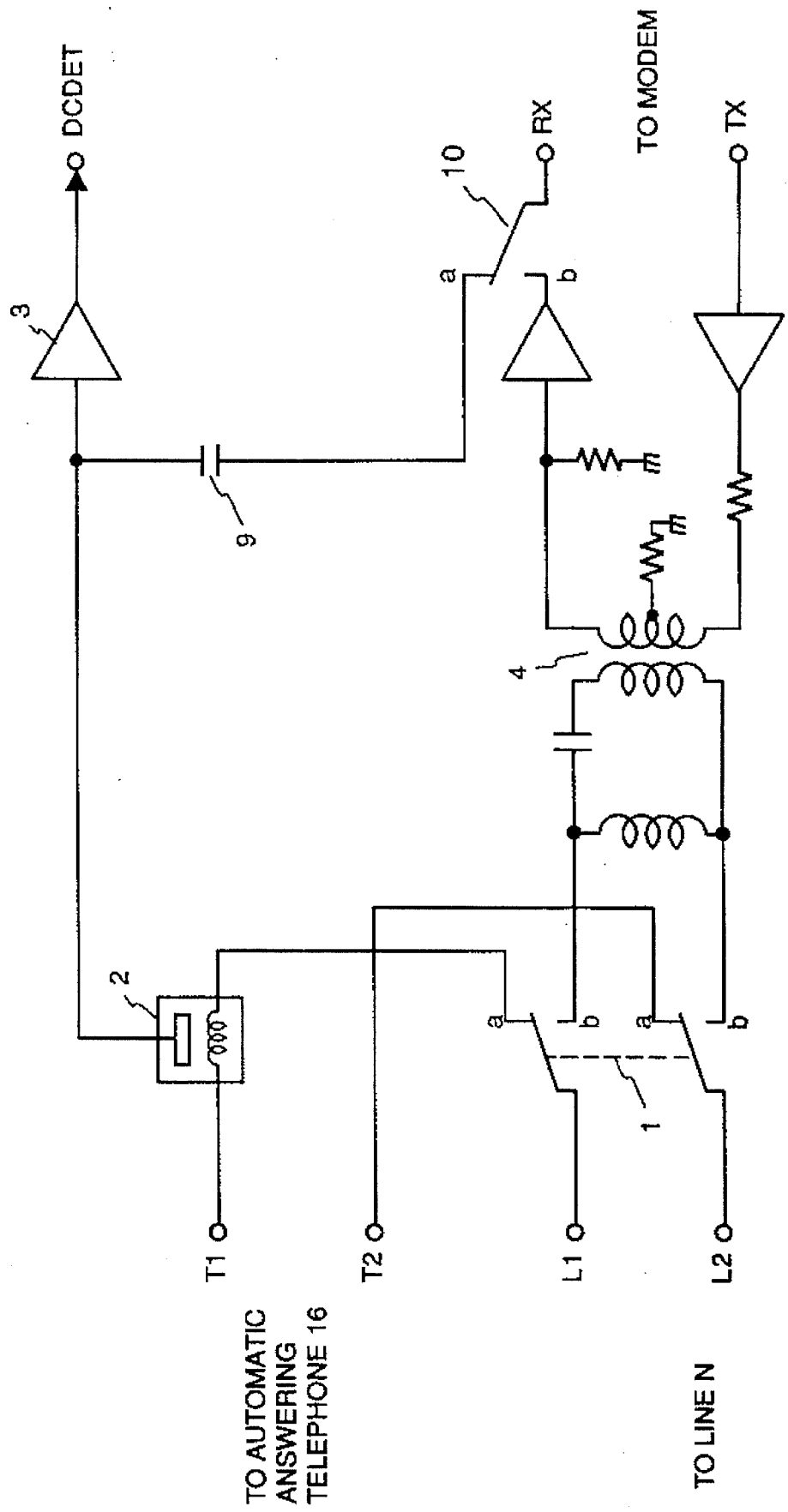
FIG. 5 is a block diagram showing the construction of a modification of the NCU in the first embodiment of this invention.

FIGS. 4 and 5 are block diagrams illustrating the construction of the NCU 107 according to another embodiment. Portions corresponding to those shown in FIG. 2 are designated by like reference numerals and are not described again.

In FIG. 4, only the AC component is extracted from the output of the current sensor 2 via the capacitor 9, and the AC component is inputted to the CNG detector 7 and DTMF detector 8. As a result, the capacitor 5 and the transformer 6 in the arrangement of FIG. 2 are no longer required.

FIG. 5 is a block diagram showing the construction of the NCU 107 in a case where CNG and DTMF are detected by the modem 106. A switch 10 is connected to the reception input terminal of the modem 106 and is changed over at a timing identical with that of the CML relay 1, whereby input of a facsimile signal or connection of the output from the current sensor 2 can be selected. Thus, the CNG detector 7 and DTMF detector 8 shown in FIGS. 2 and 4 can be eliminated.

In accordance with the first embodiment described above, when an automatic answering telephone is made to perform remote playback, for example, the starting of the facsimile operation can be prevented by a facsimile-related signal contained in the reproduced sound.

In the foregoing, a case has been described in which the CNG signal is detected to make the automatic changeover between the automatic answering telephone and facsimile communication. Next, however, a case will be described in which the automatic changeover is made by detecting the CNG signal and a silent state.

Figure 7:
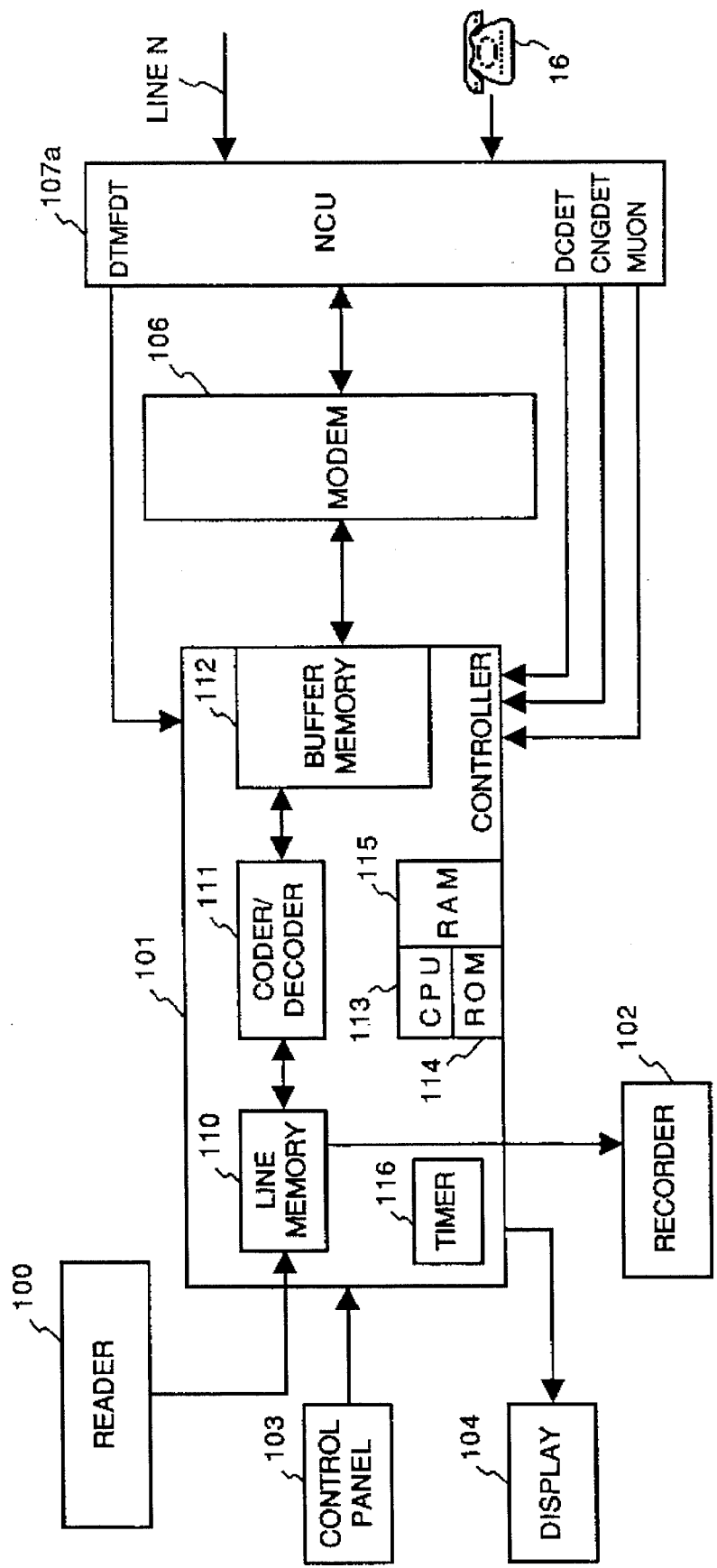
FIG. 7 is a block diagram showing the construction of a facsimile apparatus according to a second embodiment of the present invention.

FIG. 7 is a block diagram illustrating the construction of a facsimile apparatus according to a second embodiment of the present invention, in which the CNG signal and a silent state are detected. Portions designated by numerals identical with those in FIG. 1 are the same as those described in connection with FIG. 1 and these portions need not be described again.

Figure 8:
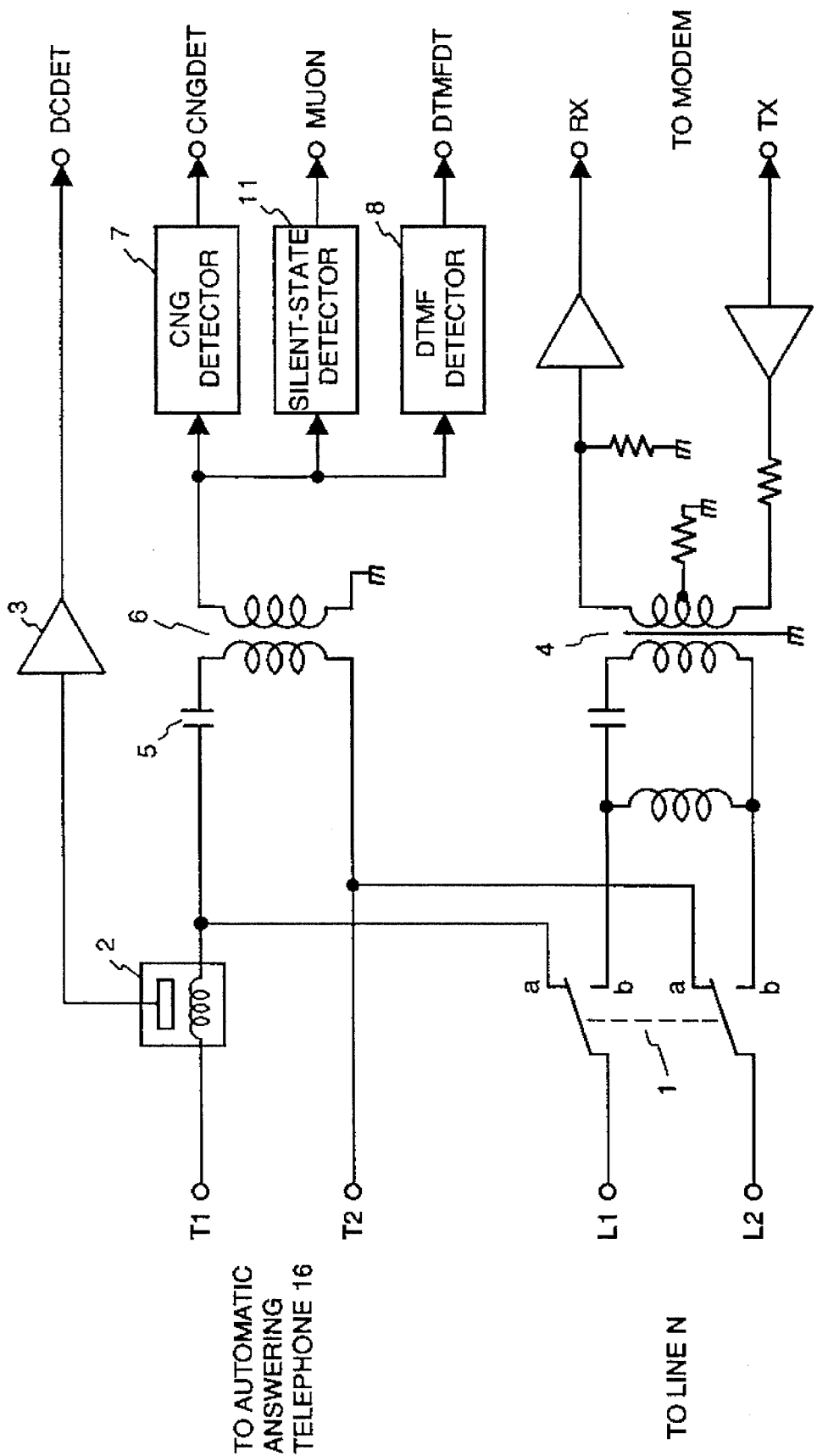
FIG. 8 is a block diagram showing the construction of an NCU in the facsimile apparatus of the second embodiment.

In FIG. 7, an NCU 107a is provided with a silent-state detecting circuit 11, as shown in FIG. 8. The silent-state detecting circuit 11 detects a silent state by detecting the energy on the line and provides the controller 101 with a MUON signal indicative of detection of the silent state. Numeral 116 denotes a timer to which time information from the CPU 113 is applied. At elapse of the stipulated time, the timer 116 outputs a signal indicative of time expiration or the like to the CPU 113, thereby notifying the CPU 113 of the fact that the time has elapsed.

Figure 9:
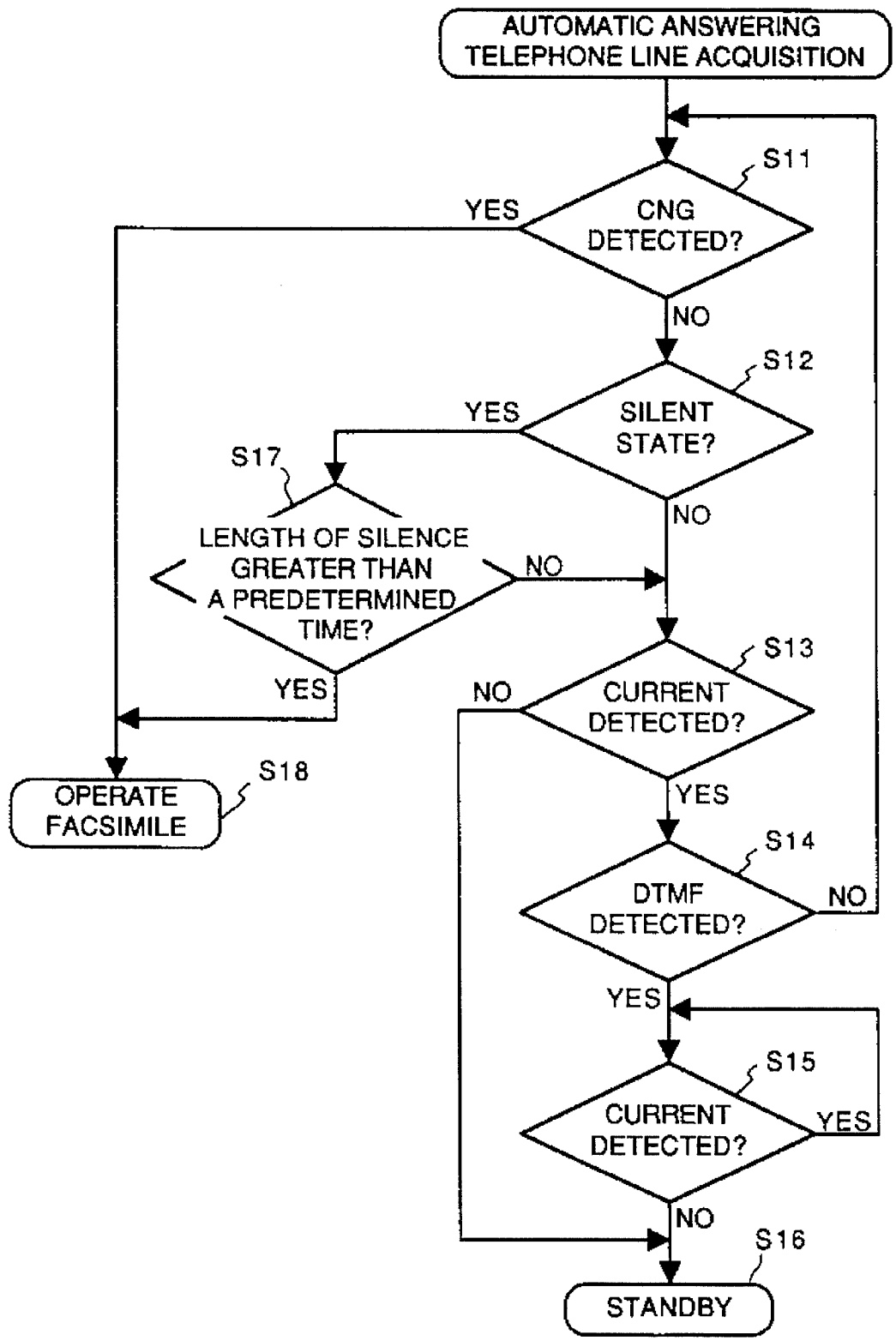
FIG. 9 is a flowchart showing a receiving operation performed by the facsimile apparatus of the second embodiment.

Next, reference will be had to the flowchart of FIG. 9 to describe the automatic changeover between the automatic answering telephone 16 and the facsimile based upon detection of the CNG (CNGDET) signal and the silent-state (MUON) signal. The flowchart of FIG. 9 illustrates the control operation of the controller 101 (CPU 113) and the control procedure illustrated is stored in the ROM 114.

First, in the standby state, the controller 101 monitors the DCDET signal. When the automatic answering telephone 16 automatically answers a call signal from the line, a direct current flows into the current sensor 2 and the comparator 3 outputs the DCDET signal. Upon sensing this signal, the controller 101 causes processing to enter a loop in which steps S11, S12, S13, S14 are executed followed by return to step S11. When a line is connected and direct current is cut off in this loop, a transition is made to the standby state from step S13.

If the calling party is a facsimile apparatus which transmits the CNG signal, this is detected at step S11 and the program proceeds to step S18. Here the CML relay 1 is changed over to the b side to start the facsimile communication operation.

If the calling party is a facsimile apparatus which does not transmit the CNG signal, the line attains the silent state and therefore the program proceeds from step S12 to step S17. Here the length of silent time is judged using the timer 116. If the length of silent time is greater than a predetermined time, then the program proceeds to step S18, at which the facsimile operation is carried out. If the length of silent time is less than the predetermined time, on the other hand, the program proceeds to step S13.

In a case where the calling party is the user of the automatic answering telephone and sends the DTMF signal for remotely controlling the automatic answering telephone 16, the DTMF signal is detected at step S14, the program exits from the aforesaid loop and proceeds to step S15. Here the system waits for the line to be cut. When the line is cut, the program proceeds to step S16, at which the system returns to the standby state.

In accordance with the operation described above, once the DTMF signal has been detected, detection of the CNG signal and of the silent state is no longer carried out. As a result, even if the silent state is attained during remote control of the automatic answering telephone 16, the facsimile operation is not carried out.

In accordance with the second embodiment, as described above, when an automatic answering telephone is made to perform remote playback, for example, erroneous operation of the facsimile due to such playback is capable of being prevented.

Figure 10:
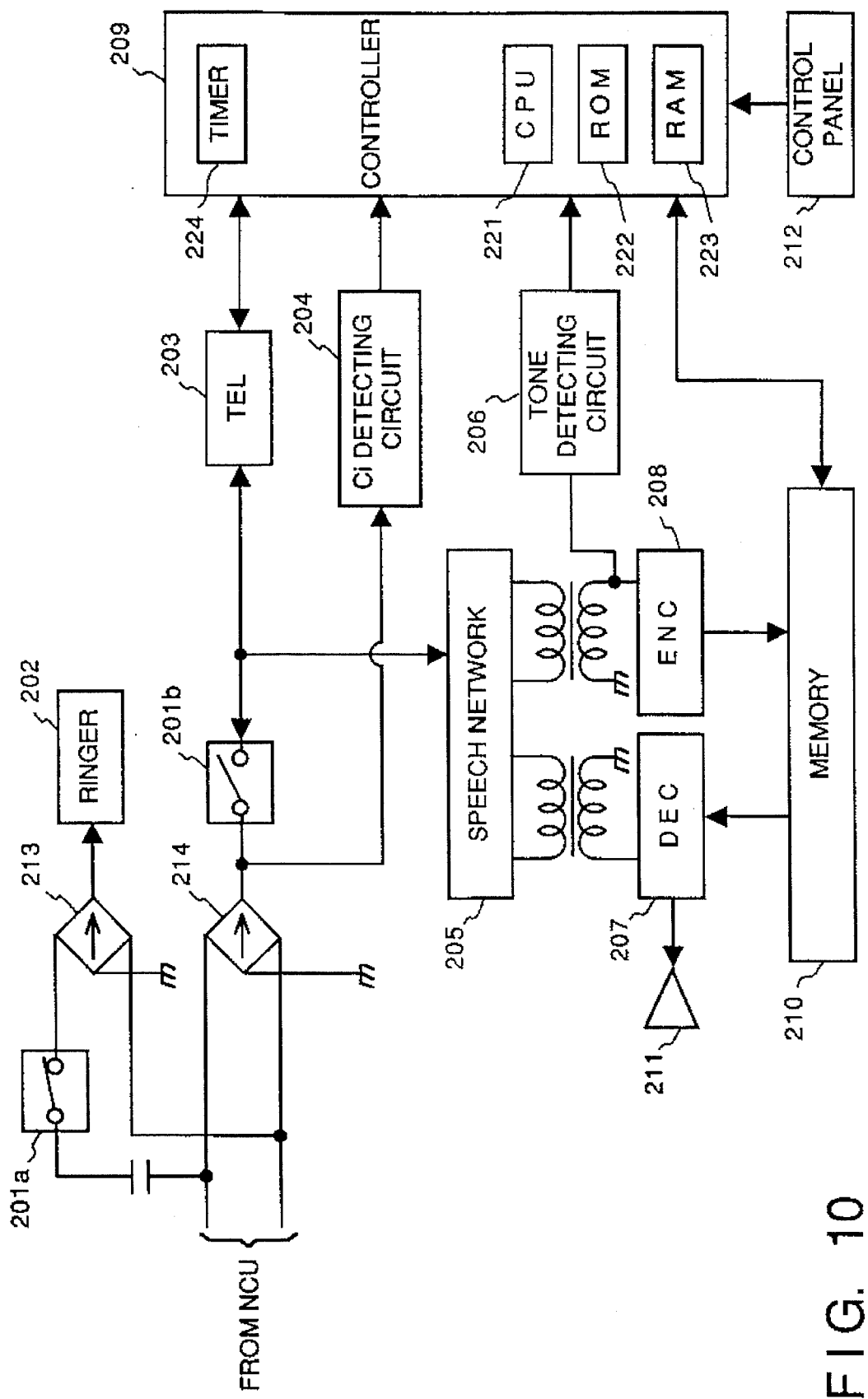
FIG. 10 is a block diagram showing the construction of an automatic answering telephone according to a third embodiment of the invention.

FIG. 10 is a diagram for describing a third embodiment of the present invention. This is a block diagram showing the construction of the automatic answering telephone 16 depicted in FIG. 1 or FIG. 7. The automatic answering telephone 16, which uses a semiconductor memory as means for storing a voice message, is connected to an auxiliary telephone 203 connected to the NCU 107 of the above-described facsimile apparatus.

In FIG. 10, relay contacts 201a, 201b are controlled by a controller 209. The controller 209 detects that the telephone 203 is off the hook, and a Ci signal is detected by a Ci-signal detecting circuit 204, thereby starting the automatic answering telephone. The relay contacts 201a, 201b are operatively associated. The relays are changed over in such a manner that when the contact 201a is closed, the other contact 201b is opened.

A ringer 202 issues a ringing tone based upon the Ci signal inputted via the terminals T1, T2 (FIG. 2) of the NCU 107 and applied to the ringer from the line N via a rectifying circuit 213. Upon detecting an incoming call based upon the Ci signal inputted from the line N via a rectifying circuit 214, the Ci-signal detecting circuit 204 so notifies the controller 209. A speech network 205 performs a two-line/ four-line conversion of sent and received signals. The tone detecting circuit 206 detects a tone signal, such as the CNG signal (1100 Hz).

A decoder (DEC) 207 decodes an answer message or recorded message stored in a memory 210, converts the decoded message into an analog voice signal and delivers the voice signal to a speaker 211. In order to store a received message in the memory 210, the encoder (ENC) 208 digitizes the voice signal to convert it into a suitable code. The controller 209 includes a CPU 221, a ROM 222 which stores the control program of the CPU 221 as well as various data, a RAM 223 used as a working area of the CPU 221, and a timer 224 which, in response to a command from the CPU 221, measures time and notifies the CPU 221 of the measured time. The controller 209 controls the entirety of the automatic answering telephone 16 in this embodiment. The memory 210 is a semiconductor memory for storing an answer message as well as messages from calling parties. The speaker 211, which is used when a message recorded in the memory 210 is played back, outputs the voice decoded by the decoder 207. Numeral 212 denotes a control panel having a variety of keys for various operations.

Figure 11:
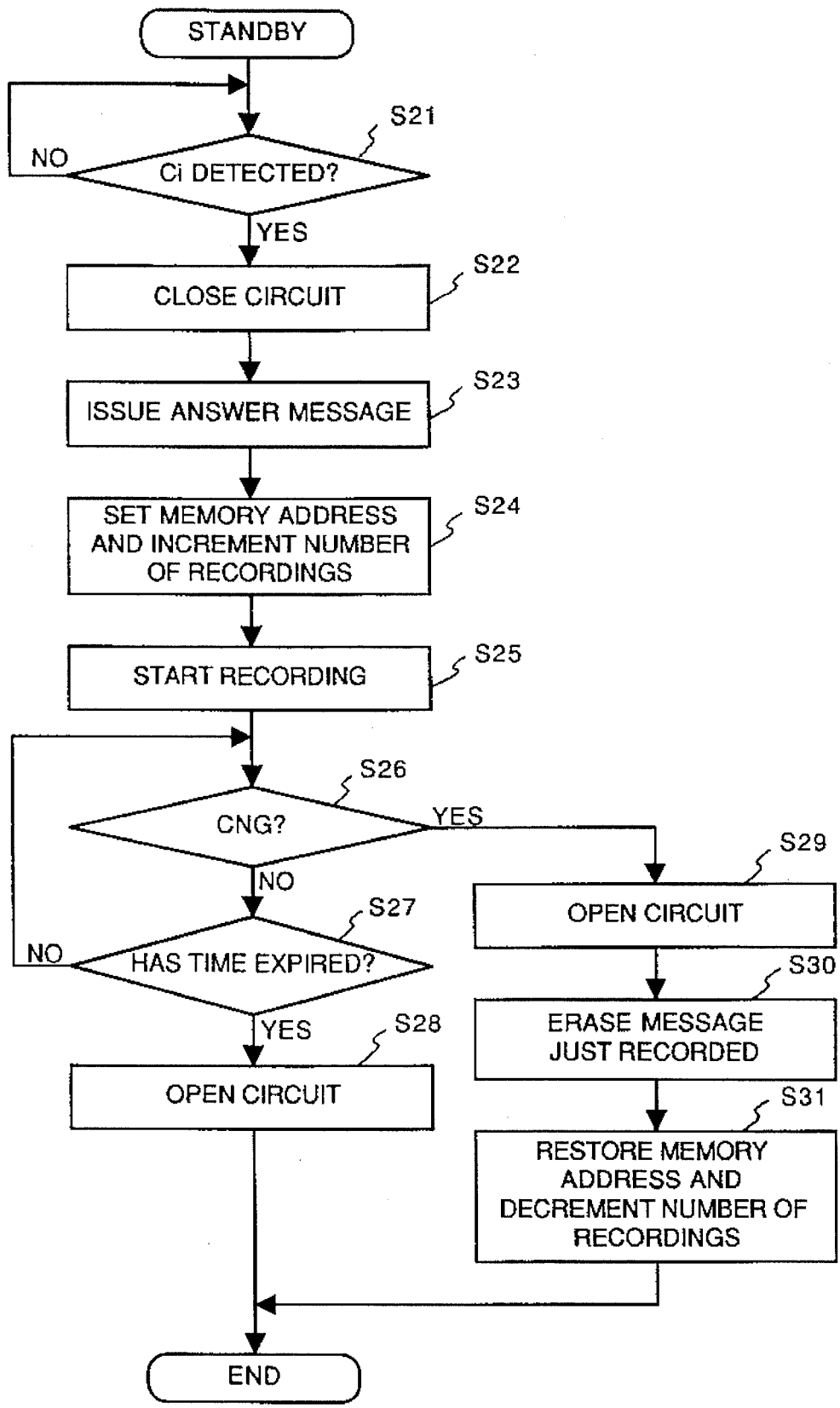
FIG. 11 is a flowchart showing operation of the automatic answering telephone of the third embodiment when a message is received.

FIG. 11 is a flowchart illustrating the operation of the automatic answering telephone 16 when a message is received according to the third embodiment. The control program for executing this processing is stored in the ROM 222.

First, at step S21, the controller 209 performs monitoring to determine whether the Ci signal has been detected by the Ci-signal detecting circuit 204. When the Ci signal has been detected, the program proceeds to step S22, at which the relay contact 201*b* is closed to close the path between the line from the NCU 107 and the auxiliary telephone 203. Next, the answer message that has been stored in the memory 210 is read out and sent to the decoder 207, the answer message is decoded by the decoder 207 and subjected to a D/A conversion, and the audio of the voice message is sent out on the line (step S23). An address is set to the beginning of the blank portion of the recording area of memory 210, and the number of recorded messages stored in the controller 209 is incremented by one (step S24).

Next, the program proceeds to step S25, at which the message received from the calling party is A/D converted and encoded by the encoder 208 and the encoded message is written in the memory 210 successively starting from the address of memory 210 set at step S24.

At the same time, it is determined at step S26 whether the CNG signal has been detected by the tone detecting circuit 206. If the CNG signal has not been detected, then the timer 224 determines at step S27 whether a predetermined period of time has elapsed. If the predetermined time has not yet elapsed, the program returns to step S26 and monitoring for detection of the CNG signal is performed while recording of the received message continues. In a case where the predetermined time elapses without the CNG signal being detected, the program proceeds to step S28, at which the relay contact 201*b* is opened to release the line N and end processing for receiving the message from the calling party.

On the other hand, in a case where the CNG signal is detected at step S26, the program proceeds to step S29, at which the relay contact 201*b* is opened and the line N is released. The program then proceeds to step S30, at which the message just recorded (actually the CNG signal) is erased from the memory 210. In this case, the controller 209 creates data in which silence has been encoded by the encoder 208 and writes this silence data on the message data just recorded in the memory 210. Thereafter, the controller 209 restores the address of the memory 210 to the value set at step S24 and decrements by one the number of recorded messages incremented at step S24 (step S31).

Figure 12:
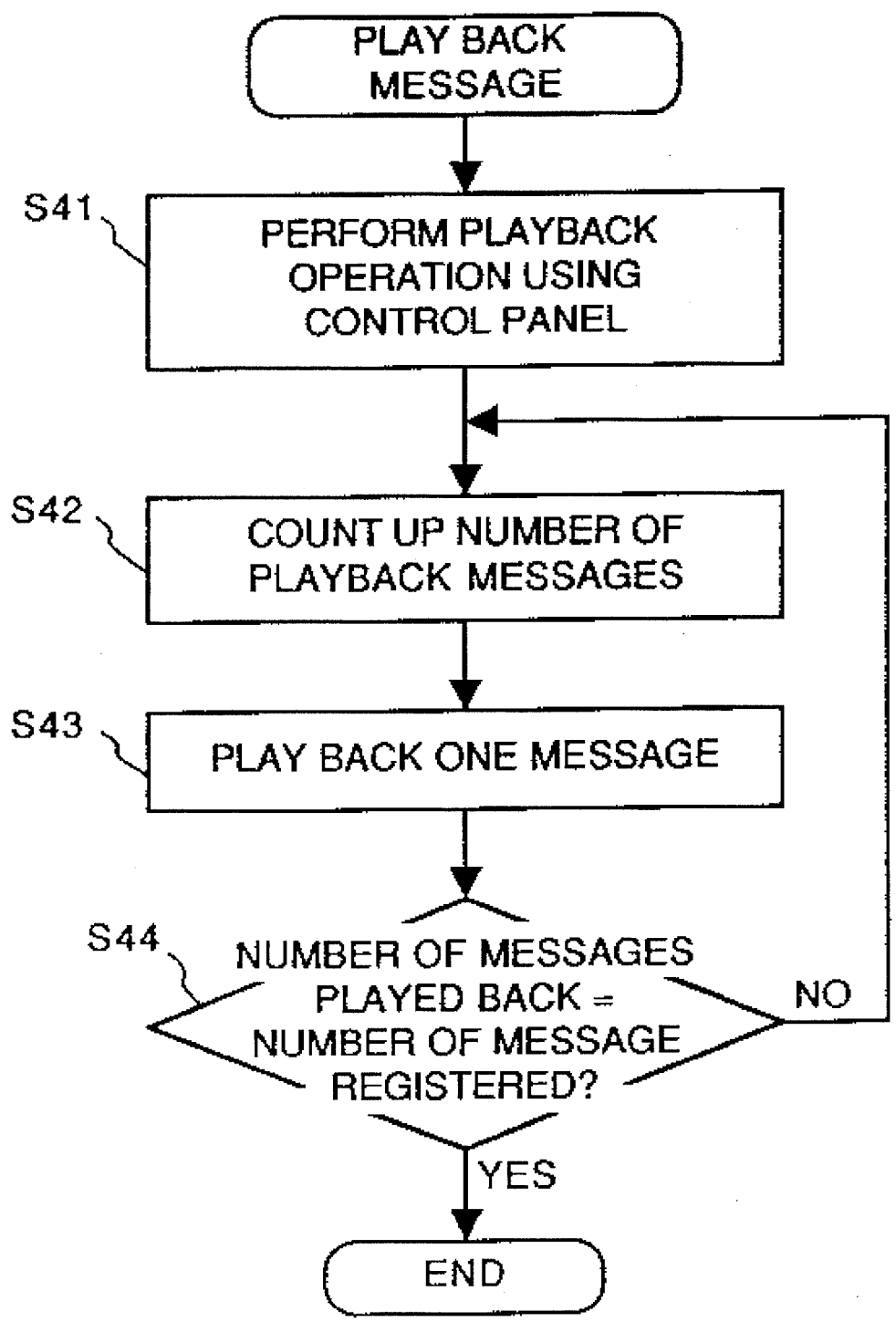
FIG. 12 is a flowchart showing operation at playback of a recorded message in the third embodiment.

FIG. 12 is a flowchart showing operation at playback of a recorded message according to the third embodiment.

First, at step S41, a key designating message playback is pressed on the control panel 212. When this is done, the program proceeds to step S42, at which the number of playback messages is counted up. Before message playback is performed, the number of playback messages is "0". Next, the program proceeds to step S43, at which one message is read out of the memory 210, the message is converted into an analog voice signal by the decoder 207 and the voice message is played back through the speaker 211. The program then proceeds to step S44, at which the number of playback messages and the number of recordings are compared and it is determined whether they coincide. If the two do not coincide, the program returns to step S42 and the next message is played back. If the two do coincide, then the message playback operation is ended, the number of playback messages is returned to "0" and processing is terminated.

When a tone signal is detected in the third embodiment described above, the message just recorded is erased. Furthermore, the number of messages is not counted. However, it is permissible for the apparatus to be one having only one of these functions.

Figure 13:
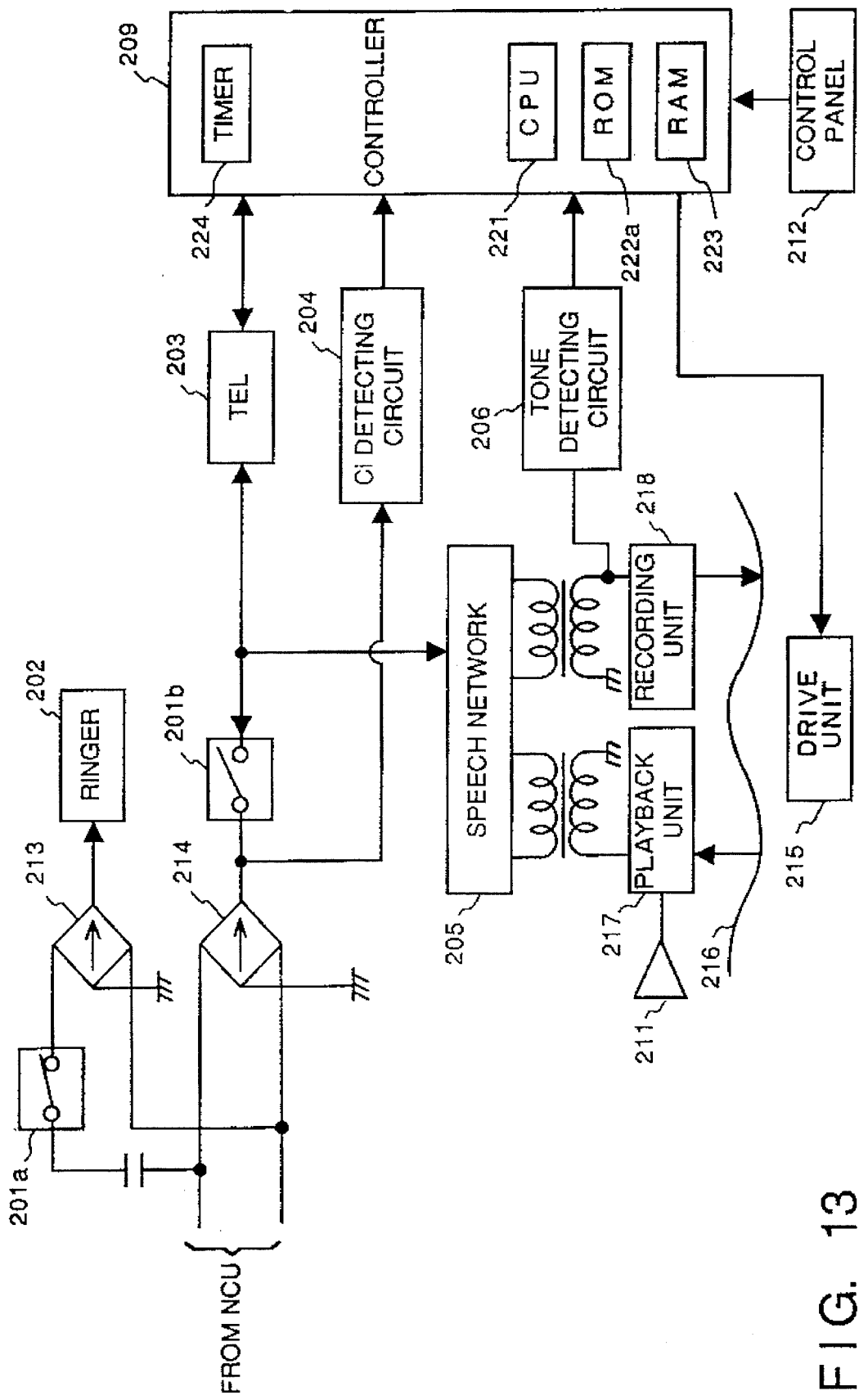
FIG. 13 is a block diagram showing the construction of an automatic answering telephone according to a fourth embodiment of the invention.

FIG. 13 is a block diagram illustrating the construction of an automatic answering telephone according to a fourth embodiment of the invention. The automatic answering telephone of the fourth embodiment uses a magnetic tape recorder as the voice-message recording means. Instead of being equipped with the decoder 207, encoder 208 and memory 210 of the third embodiment, the automatic answering telephone of the fourth embodiment is provided with a drive unit 215, a recording unit 218 and a playback unit 217 for recording messages on and playing them back from a magnetic tape 216. With the exception of the operation of the controller 209, the other components are similar to those of the third embodiment and need not be described again.

The playback unit 217, which plays back a message that has been recorded on the magnetic tape 216, includes a playback head, an amplifier and the like. The recording unit 218, which records a received message on the magnetic tape 216, includes a recording head. The drive unit 215 is for paying out and rewinding the magnetic tape 216 and has a tape-reel driving motor, a driver and the like.

Figure 14:
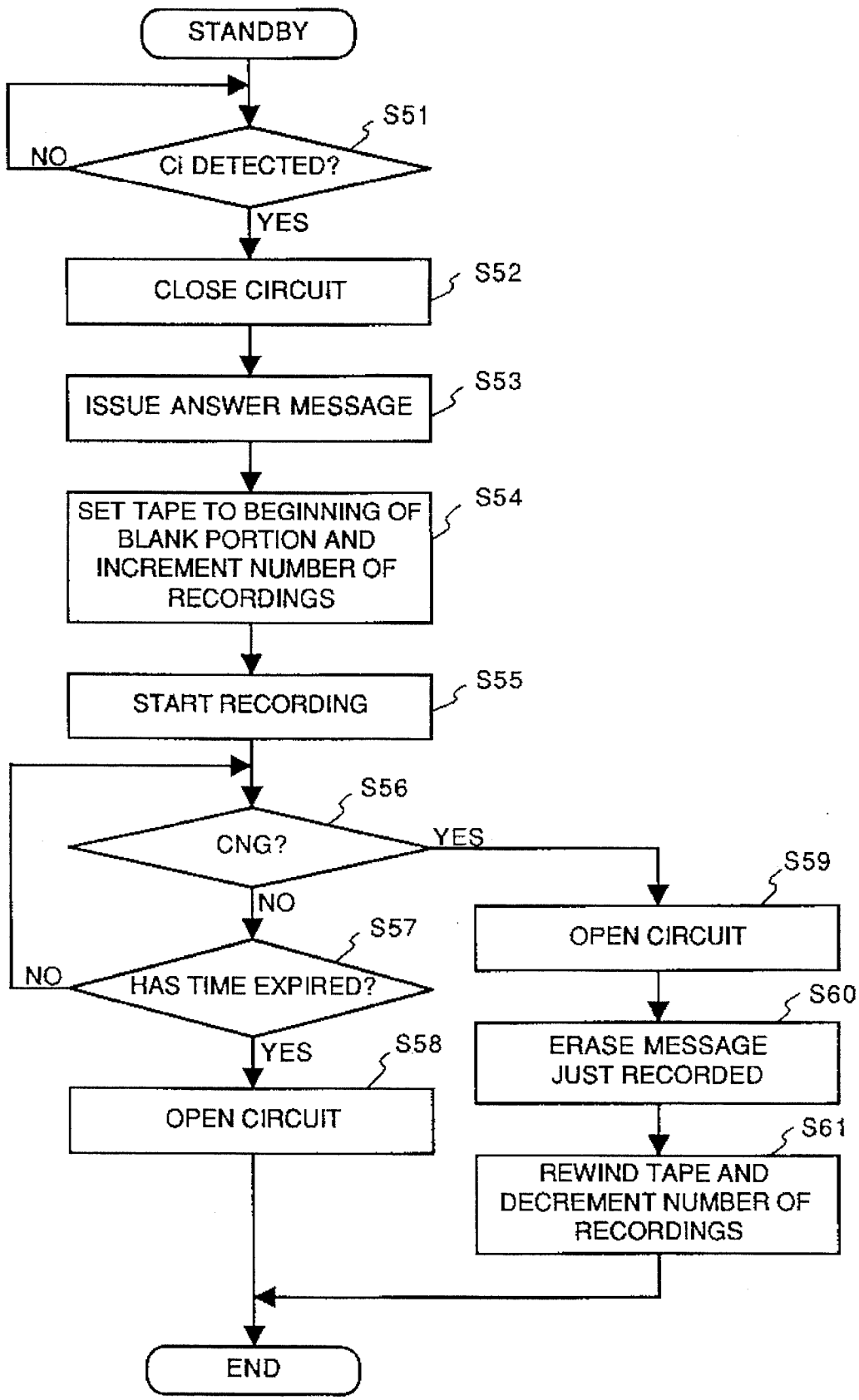
FIG. 14 is a flowchart showing operation of the automatic answering telephone of the fourth embodiment when a message is received.

FIG. 14 is a flowchart illustrating the operation of the automatic answering telephone when a message is received according to the fourth embodiment. The control program for executing this processing is stored in a ROM 222*a*.

First, at step S51, the controller 209 performs monitoring to determine whether the Ci signal has been detected by the Ci-signal detecting circuit 204. When the Ci signal has been detected, the program proceeds to step S52, at which the relay contact 201*b* is closed to close the path between the line N and the auxiliary telephone 203. The program then proceeds to step S53, at which an answer message is sent out on the line N. This is followed by step S54, at which the magnetic tape 216 is moved in such a manner that the magnetic head comes to be situated at the beginning of the blank portion of the tape. In addition, the number of recordings stored in the controller 209 is incremented by one. The program then proceeds to step S55, at which the message received from the calling party is sent to the recording unit 218 and the magnetic tape 216 is moved by the driving unit 215 to record the message from the calling party on the magnetic tape 216.

At the same time, it is determined at step S56 whether the CNG signal has been detected by the tone detecting circuit 206. If the CNG signal has not been detected, then the timer 224 determines at step S57 whether a predetermined period of time has elapsed. If the predetermined time has not yet elapsed, the program returns to step S56 and monitoring for detection of the CNG signal is performed while recording of the received message continues. In a case where the predetermined time elapses without the CNG signal being detected, the program proceeds to step S58, at which the relay contact 201b is opened to release the line N and end processing for receiving the message from the calling party.

On the other hand, in a case where the CNG signal is detected at step S56, the program proceeds to step S59, at which the relay contact 201b is opened and the line N is released. Thereafter, the program proceeds to step S60, at which the magnetic tape 216 is rewound by the driving unit 215 in such a manner that it will come to the position at which the magnetic head was set at step S54 (i.e., the message-recording starting position based upon detection of the CNG signal, silence is recorded by the recording unit 218 and the message just recorded (actually the CNG signal) is erased. When the CNG signal has been erased completely, the program proceeds to step S61, at which the magnetic tape 216 is rewound to the position set at step S54 and the number of recorded messages incremented at step S54 is decremented by one.

Operation when a recorded message is played back is the same as in the third embodiment and a description thereof is deleted. Further, in the fourth embodiment above, the arrangement is such that the message just recorded is erased and the number of messages is not counted when the tone signal is detected. However, it is permissible for the apparatus to be one having only one of these functions.

Figure 15:
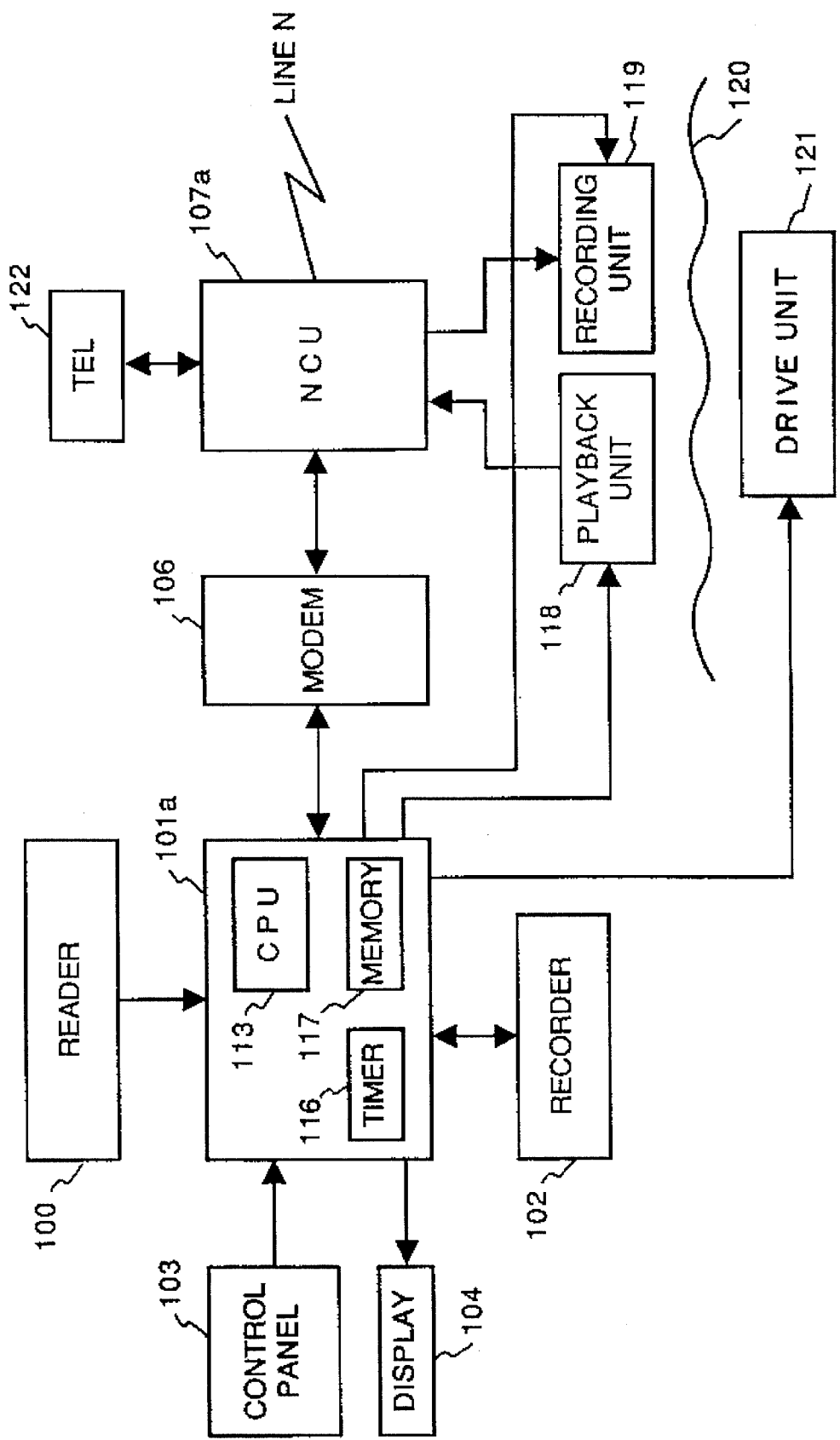
FIG. 15 is a block diagram showing the construction of a facsimile apparatus with an automatic answering telephone function according to a fifth embodiment of the invention.

FIG. 15 is a block diagram illustrating the construction of a facsimile apparatus equipped with an automatic answering telephone function according to a fifth embodiment of the invention. Portions corresponding to those of the facsimile apparatus of the first embodiment are designated by like reference numerals and need not be described again.

Shown in FIG. 15 are a hand set 122 for communication by voice, an NCU 107a for connecting the line N to the telephone 122 or modem 106, a playback unit 118 for playing back a message recorded on a magnetic recording medium 120, a recording unit 119 for recording a received message on the magnetic recording medium 120, and a driving unit 121 for driving the magnetic recording medium 120. A controller 101a includes a CPU 113, a memory 117 having a ROM section storing a control program of the CPU 113 and a RAM section used as a working area, and a timer 116. Data indicating the number of recorded voice messages also are stored in the RAM section of the memory 117.

Figure 16:
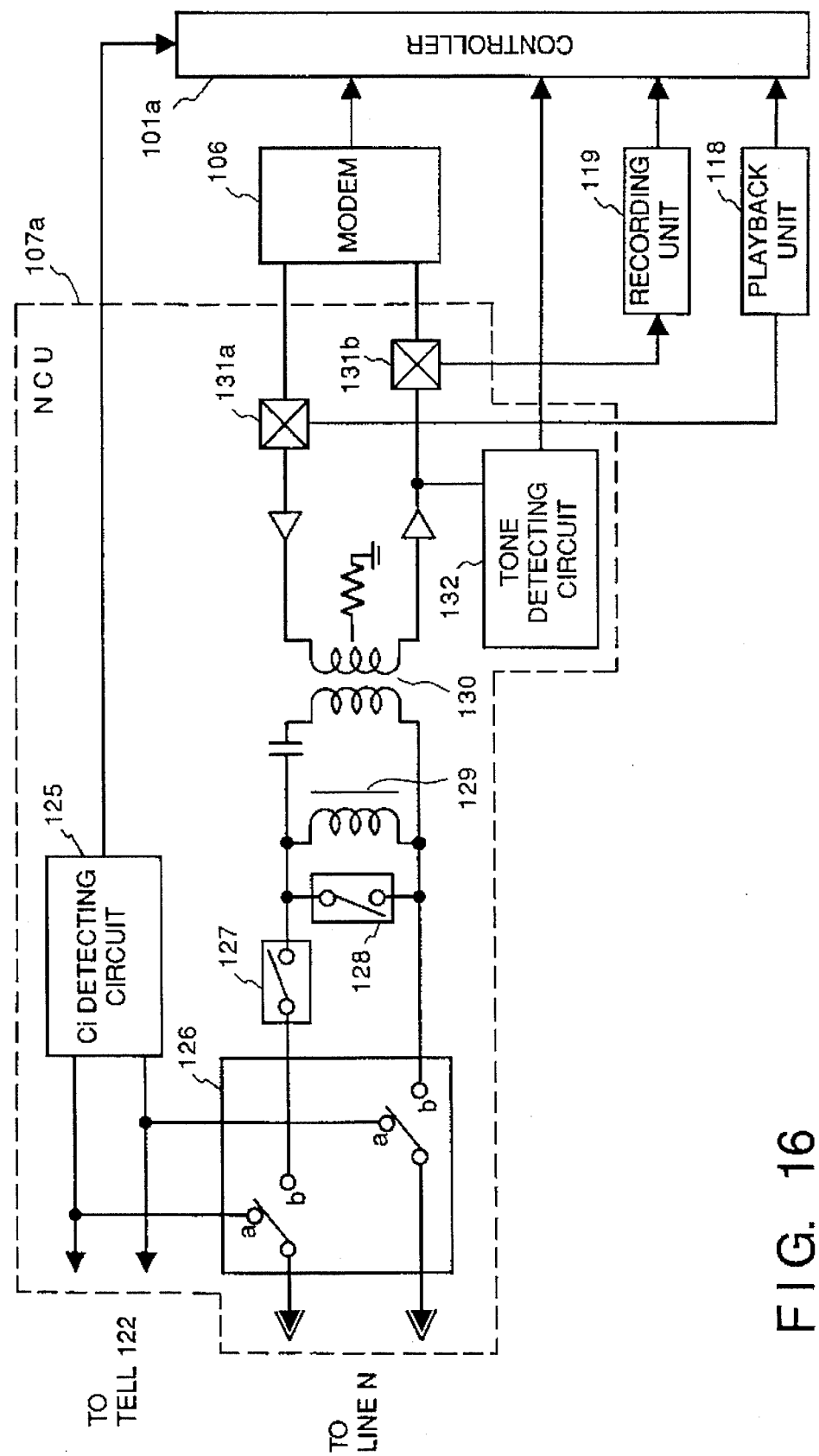
FIG. 16 is a block diagram showing the construction of an NCU in the facsimile apparatus of the fifth embodiment.

FIG. 16 is a block diagram showing the construction of the NCU 107a.

When Ci (the call signal) arrives, a Ci-signal detecting circuit 125 sends a detection signal to the controller 101a. A CML relay 126 is a relay which performs changeover between the hand set 122 and the facsimile side. A P relay 127 is a relay for generating a dial pulse, and an S relay 128 is a relay for suppressing a transient voltage change when a dial pulse is generated. A RET coil 129 is a coil for forming a DC loop. A hybrid transformer 130 is for interrupting the direct current between the line side and the modem side. Analog switches 131a, 131b change over the connections to the playback unit 118 and recording unit 119, respectively. A tone detecting circuit 132 is for detecting signal such as the CNG signal.

Figure 17:
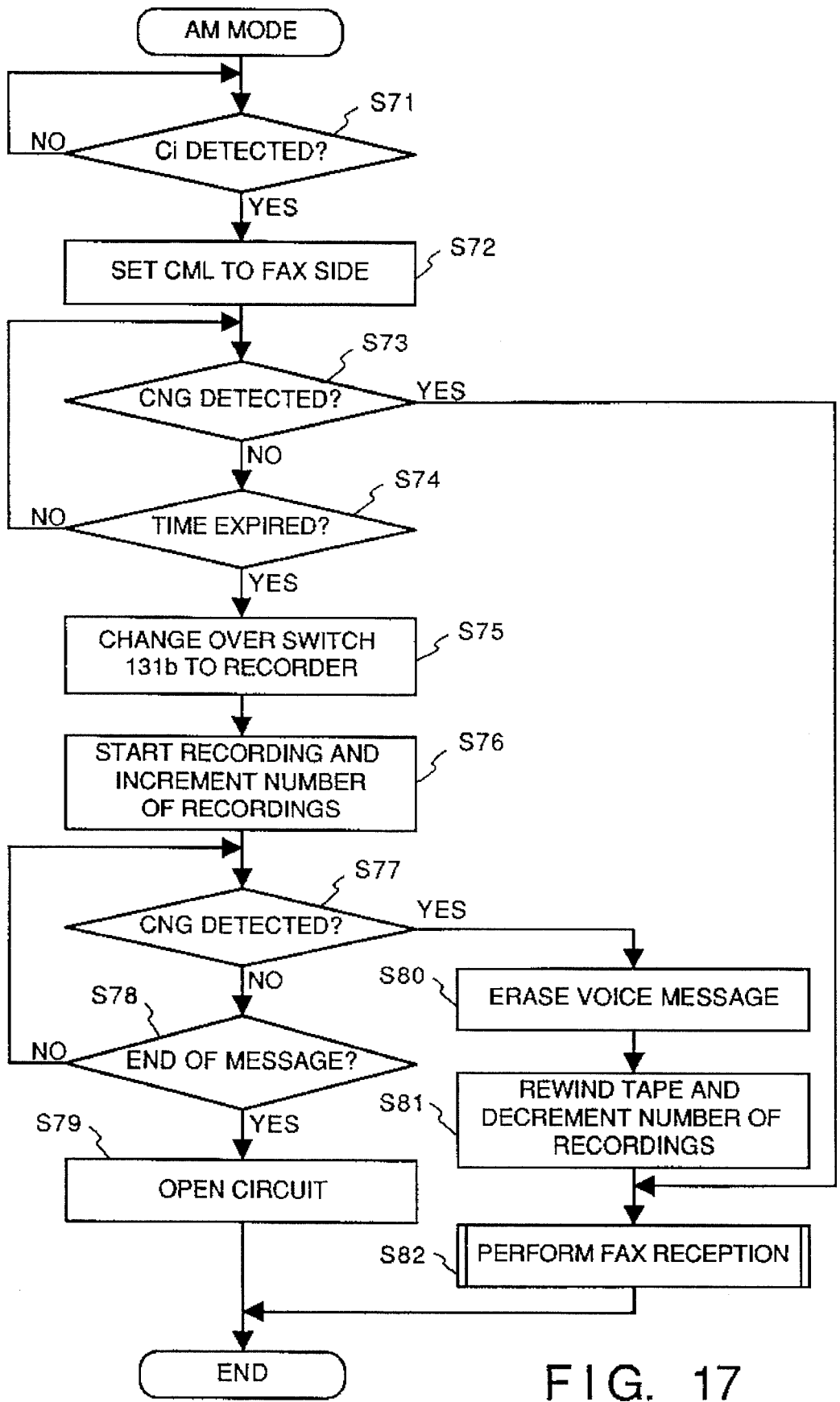
FIG. 17 is a flowchart showing operation of the facsimile apparatus of the fifth embodiment when an automatic answering telephone mode (AM mode) is in effect.

FIG. 17 is a flowchart illustrating operation of the automatic answering mode (AM mode) in a facsimile apparatus according to a fifth embodiment. The control program for executing this processing is stored in the ROM section of the memory 117.

First, at step S71, it is determined whether the Ci signal has been detected by the Ci-signal detecting circuit 125. When the Ci signal is not detected, the system remains in the standby state. When the Ci signal is detected, the program proceeds to step S72, at which the CML relay 126 is changed over to the facsimile side (the side of terminal b). At this time the P relay 127 is closed and the S relay 128 is opened. Next, at step S73, it is determined whether the tone detecting circuit 132 has detected the CNG signal. At this time, an answer message that has been stored in the memory 117 is sent simultaneously to the line N through the modem 106. The CNG signal is monitored during the answer message. When the CNG signal is detected at step S73, the program proceeds to step S82, at which processing for facsimile reception is performed.

In a case where the CNG signal is not detected at step S73, the program proceeds to step S74, at which it is determined whether a predetermined period of time has been measured by the timer 116. If the time has not expired, the program returns to step S73 and the above-described processing is executed. If the time is found to have expired at step S73, the program proceeds to step S75, at which the switch 131b is changed over so that the signal from the line N enters the recording unit 119. The program then proceeds to step S76, at which recording starts and the number of recordings stored in the memory is incremented by one.

Next, the program proceeds to step S77, at which detection of the CNG signal is performed by the tone detecting circuit 132 while the message is recorded by the recording unit 119. The program proceeds to step S80 when the CNG signal is detected. When the CNG signal is not detected, the program proceeds to step S78, at which it is determined whether the message has ended. A determination that the message has ended can be made by detecting silence or by detection based upon loop current. If the message is found to have ended at step S78, then the program proceeds to step S79, at which the line is opened and the system returns to the standby state.

If the CNG signal is detected at step S77, the program proceeds to step S80, at which recording is suspended and the message just recorded is erased. Then, at step S81, the magnetic tape (recording medium) 120 is rewound to the recording starting position of step S76 by the driving unit 121, and the number of recordings incremented at step S76 is decremented by one to be returned to the original value. Processing for facsimile reception is then executed at step S82.

Operation when a recorded message is played back is the same as in the third embodiment and a description thereof is deleted. Further, in the fifth embodiment above, the arrangement is such that when the tone signal is detected, the message just recorded is erased, the next message is recorded in the present recording area and the number of messages is decremented. However, it is permissible for the apparatus to be one having only one of these functions.

In accordance with the fifth embodiment, as described above, even if the CNG signal has been recorded, this recorded CNG signal is erased when the CNG signal is detected during recording. As a result, the CNG signal is not played back. More specifically, when a tone signal from the line is detected after the storage of a voice message has started in response to an incoming call, the present voice message is erased without the number of messages being counted, and the storage of the next voice message is performed from the area at which storage of the present voice message started. As a result, it is possible to prevent a tone signal from remaining recorded in a state mixed with a message, wasteful use of recording capacity can be reduced and erroneous operation due to playback of the tone signal can be prevented.

A sixth embodiment of the invention will now be described. In this embodiment, an automatic answering telephone 311 is started by the Ci signal from the line N. If, when a received-message recording start signal of the automatic answering telephone 311 is detected without it being possible to detect the CNG signal during playback of an answer message, the CNG signal is detected after the detection of the above-mentioned start signal, then remote control is performed in such a manner that a-prescribed DTMF signal is transmitted from the facsimile apparatus and the automatic answering telephone 311 is remotely controlled, whereby the CNG signal is not recorded when the message from the calling party is recorded.

Figure 18:
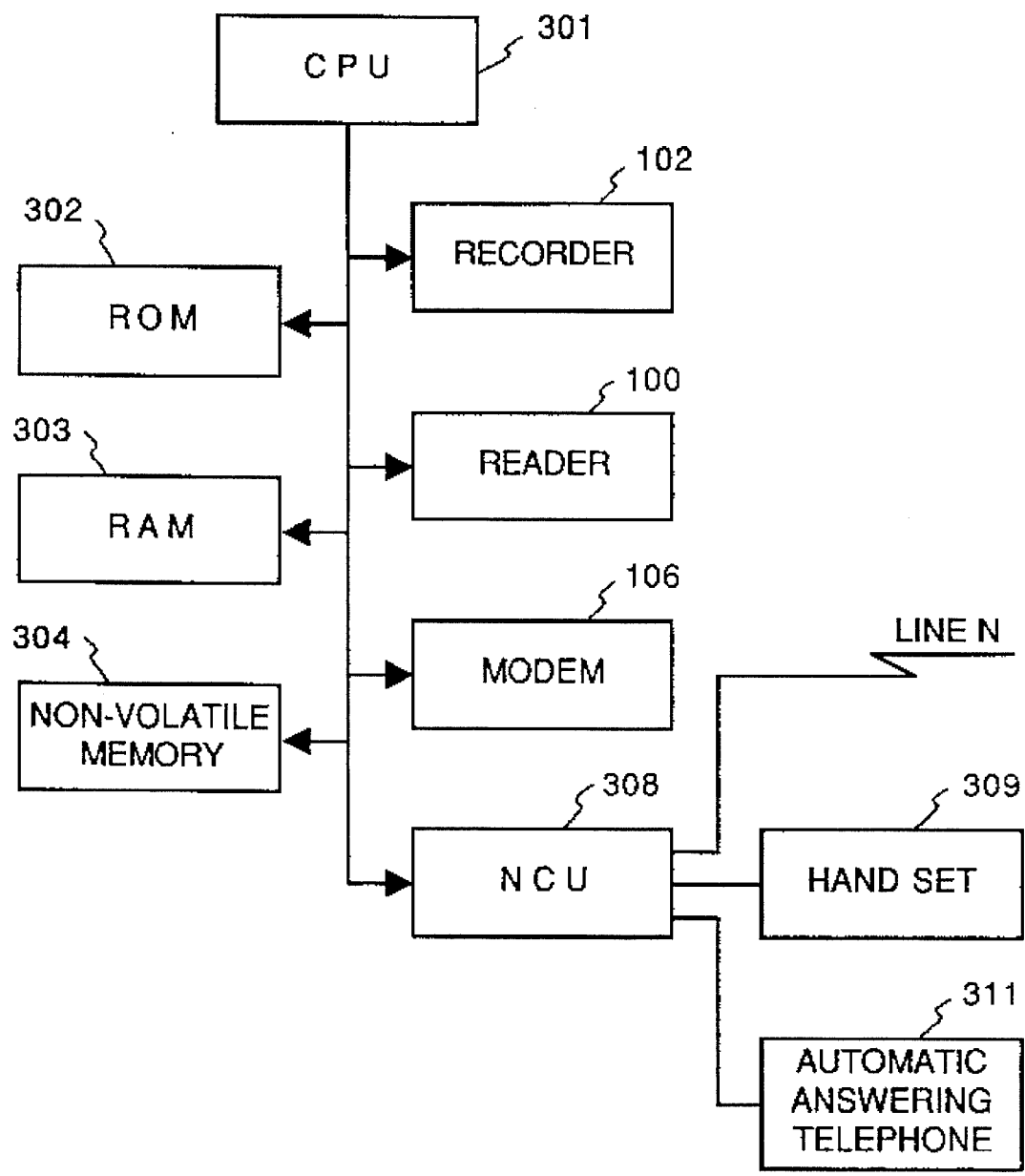
FIG. 18 is a block diagram showing the construction of a facsimile apparatus according to a sixth embodiment.

FIG. 18 is a block diagram illustrating the construction of a facsimile apparatus according to the sixth embodiment. Portions corresponding to those in the foregoing drawings are designated by like reference numerals and need not be described again.

In FIG. 18, a CPU 301 controls the overall apparatus in accordance with a program stored in a ROM 302. A RAM 303, which is used as a working area for the CPU 301, temporarily stores a variety of data. A non-volatile memory 304 is a memory such as a ROM or disk which preserves its contents even if the power supply of the facsimile apparatus is cut off. The modem 106 is constituted by, e.g., G3, G2, G1, FM modems in line with CCITT recommendations, and a clock generating circuit connected to these modems. Transmission data that has been stored in the RAM 303 is modulated based upon control by the CPU 301 and the modulated data are outputted to the telephone line N via an NCU 308. Further, the modem 106 inputs an analog signal from line N via the NCU 308, demodulates this signal and stores the binarized data is the RAM 303. The modem 106 is internally provided with a call-signal detecting circuit which detects a call signal inputted from the line N. The NCU 308 changes over and connects the line N to the modem 106 or automatic answering telephone 311 based upon control executed by the CPU 301.

The facsimile apparatus provides a hand set 309 and it is possible to reserve a telephone call in a facsimile mode using the hand set 309.

Figure 19:
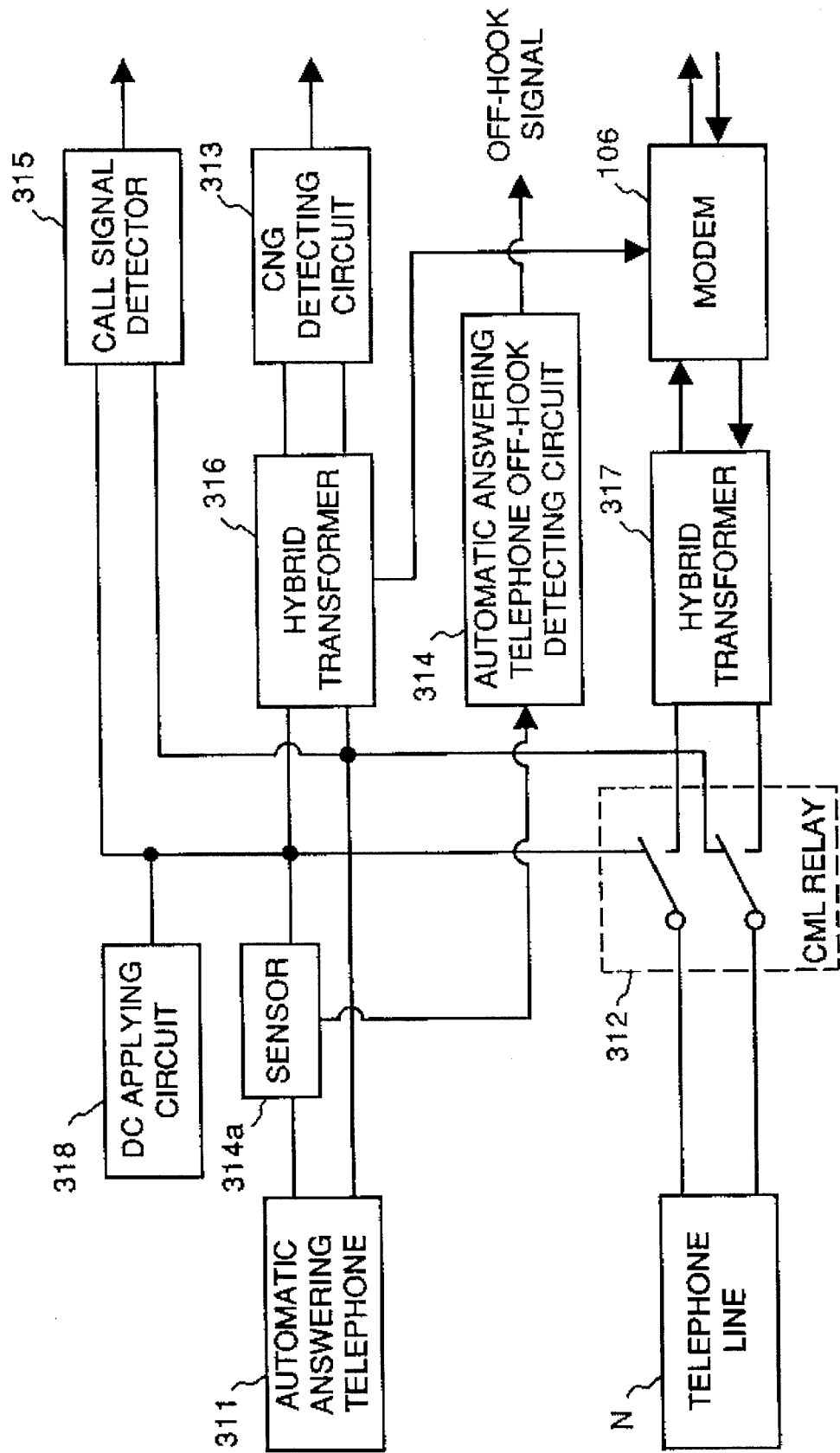
FIG. 19 is a block diagram showing the construction of a line controller of an NCU in the facsimile apparatus according to the sixth embodiment.

FIG. 19 is a block diagram illustrating the construction of a line controller of the NCU 308 in the facsimile apparatus according to the sixth embodiment.

As shown in FIG. 19, the line N is connected via a CML relay 312 to either the line of the modem 106 of the facsimile apparatus of this invention, or the line of the automatic answering telephone 311. Connected to the line of the automatic answering telephone 311 is a sensor 314a of an off-hook detecting circuit 314 which detects when the automatic answering telephone 311 is taken off the hook. The off-hook detecting circuit 314 is used in order to detect that the hand set of the automatic answering telephone 311 has been lifted by the operator, or whether the automatic answering telephone 311 is reliably responding when the telephone 311 is started by a call signal from the line N.

A CNG-signal detecting circuit 313 is connected to the line of the automatic answering telephone 311. The CNG-signal detecting circuit 313, which is for detecting a 1100 Hz CNG (facsimile call) signal specific to the calling of a facsimile apparatus, comprises a frequency discriminating circuit such as an active filter or PLL circuit, and a modem, which is different from the modem 106, connected to the line on the side of the automatic answering telephone 311. It should be noted that the CNG-signal detecting circuit 313 may be constituted by a hybrid (audio) transformer and so adapted that an analog signal representing the CNG signal is inputted to the modem 106, wherein the CNG signal is detected by the modem 106. Further, detection of a received-message recording start signal of the automatic answering telephone 311 is performed by inputting a signal to the modem 106 via the hybrid transformer 316 and detecting the received-message recording start signal by the modem 106.

Figure 20:
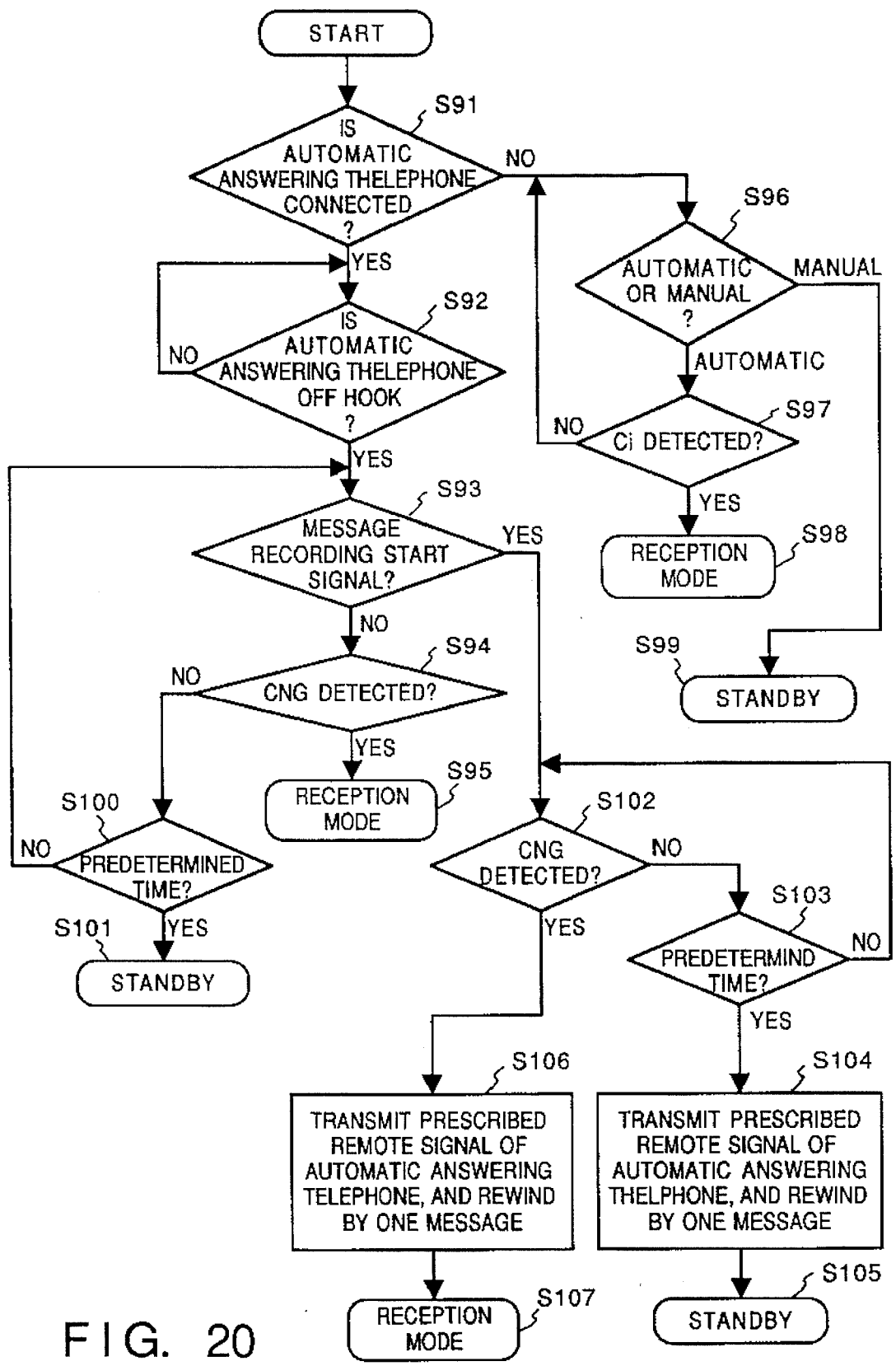
FIG. 20 is a flowchart showing the operation of the facsimile apparatus according to the sixth embodiment.

Next, the operation of the facsimile apparatus of the sixth embodiment constructed as set forth above will be described with reference to FIGS. 20 and 21. FIG. 20 is a flowchart illustrating the control program of the CPU 301 stored in the ROM 302, and FIGS. 21A, 21B are timing charts for describing incoming-call control.

Before the processing indicated in the flowchart of FIG. 20 starts, the user first registers, as a software switch (a flag or the like set by a predetermined operation using the control panel 103) in the non-volatile memory 304, the fact that the automatic answering telephone 311 has been connected. The automatic answering telephone 311 also is set to the automatic answering mode. In the standby state, the line N is connected to the side of modem 106 by the CML relay 312.

First, at step S91, if the off-hook state is detected when there is an incoming call from the line N, the CPU 301 checks the above-mentioned software switch of the non-volatile memory 304. If it is determined from the software switch that the automatic answering telephone 311 has been connected, the program proceeds to step S92. Here the line N is connected to the line side of the automatic answering telephone 311 by the CML relay 312 to input the call signal from the line N to the automatic answering telephone 311, thereby starting the telephone 311. An answer from the automatic answering telephone 311 is detected by the off-hook detecting circuit 314.

If the automatic answering telephone 311 answers, the program proceeds to step S93, at which the received-message recording start signal of the automatic answering telephone 311 is monitored. The received-message recording start signal is an audible signal tone having a frequency on the order of 1 kHz. The received-message recording start signal sent from the automatic answering telephone 311 is delivered from the hybrid circuit 316 to the modem 106 and is detected by a tonal signal detection function.

At the same time, at step S94, detection of the CNG signal is performed by the CNG-signal detecting circuit 313 for a predetermined period of time (e.g., 35 seconds, which is the initial identification time of a facsimile), decided by a timer operation at step S100, during the time that the automatic answering telephone 311 is playing back an answer message. In a case where the CNG signal has not been detected even when the predetermined time period elapses at step S100, the program proceeds to step S101, at which the automatic answering telephone 311 performs playback of the answer message and records the message from the calling party. Furthermore, at step S101, the CPU 301 monitors operation until the automatic answering telephone 311 attains the "on-hook" state.

Thus, in a case where the automatic answering telephone 311 has been connected, the automatic answering telephone 311 is connected unconditionally after an incoming call is received, and therefore a connection to the telephone 311 can be made without giving the operator on the sending side an odd impression.

If the CNG signal is detected at step S94, the program proceeds to step 95, at which the line N is connected to the side of modem 106 by the CML relay 312 and a well-known facsimile reception processing is executed. At this time, the automatic answering telephone 313 is disconnected from the line N. As a result, after playback of the answer message, the standby mode is promptly attained by detecting the silent state on the line.

In a case where a received-message recording start signal of the automatic answering telephone is detected by the tonal signal detecting function of the modem 106 at step S93, the signal CNG cannot be detected during transmission of the answer message and the automatic answering telephone 311 makes a transition to recording of the message from the calling party. Accordingly, at step S102, it is determined whether the CNG signal has been detected by the CNG-signal detecting circuit 313 during recording of the received message. The detection of the CNG signal is carried out for a predetermined period of time (the same as at step S100) determined by a timer at step S103. If the CNG signal has not been detected for the predetermined time period, the program proceeds to step S104, at which an automatic operation is performed for rewinding, by one recording, the recordings of messages received by the automatic answering telephone 311, or for ignoring the message recordings.

The processing of step S104 will be described in greater detail. A prescribed command of a remote function of the automatic answering telephone 311 is produced by the modem 106 under the control of the CPU 301, and the command is sent to the automatic answering telephone 311 via the hybrid circuit 316. The prescribed command comprises a DTMF signal of a plurality of digits. As a result, after the automatic answering telephone 311 rewinds the received messages by one message, the program proceeds to step S105, at which the CPU 301 monitors operation until the automatic answering telephone 311 attains the "on-hook" state.

If it is judged at step S102 that the CNG signal is present, then the program proceeds to step S106, at which the number of messages in the automatic answering telephone 311 are rewound by one message, just as at step S104. Next, the program proceeds to step S107, at which the line N is connected to the side of modem 106 by the CML relay 312 and well-known facsimile reception is carried out.

In a case where it is determined at step S91 that the software switch has been set so as to indicate that the automatic answering telephone 311 has not been connected, then the program proceeds to step S96, at which the status of an automatic/manual switch on the control panel for setting an automatic/manual reception mode of facsimile reception is detected, whereby a transition is made to the automatic reception mode or manual reception mode. More specifically, in a case where it has been found at step S96 that automatic reception has been set, the program proceeds to step S96, at which the call (CI) signal is detected by the call-signal detecting circuit 315. A transition to the automatic reception mode is made (step S98) when the call signal is detected.

When it is found at step S96 that manual reception has not been set, the program proceeds to step S99, at which the system waits in the standby state. Here a transition to the manual reception mode is made by taking the telephone off the hook and pressing a start button.

Thus, according to the sixth embodiment, as described above, a call signal from the line is sent directly to the automatic answering telephone 311 at the time of an incoming call, whereby the telephone 311 is started first. As a result, the automatic answering telephone 311 can be started more reliably in comparison with the case in which an automatic answering telephone is started by the conventional pseudo-call signal.

As shown in FIG. 21A, an answer message of 15~30 sec is issued after a starting period t1 of the automatic answering telephone 311 in response to a call signal from line N. After the answer message begins, the CNG signal (1100 Hz) from the line is detected intermittently, as indicated at times D, for a period of 35 seconds, which is the initial identification time of a facsimile. As a result, whether facsimile communication is to be carried out can be decided. It should be noted that the time settings in FIG. 21A are indicative of an example only, for it is permissible to shorten the starting period of the automatic answering telephone 311 and increase the number of CNG-detection times, as shown in FIG. 21B.

In accordance with the sixth embodiment, as described above, if the CNG signal is received, the CNG relay 312 is turned on, a transition is made to the facsimile procedure and the automatic answering telephone 311 is cut off from the line N. If there is no CNG signal, on the other hand, monitoring is performed until the automatic answering telephone 311 is turned off (hung up), the automatic answering telephone 311 starts recording after the answer message is issued, and the telephone is turned off and the end of the recording. More specifically, the CNG signal is used in identification of voice or image communication. Therefore, even if the other party is a telephone and a human being is communicating, the incoming call from the telephone can be identified and a connection made to the automatic answering telephone before the other party starts talking. This assures that the talker on the calling side will not experience anything unusual when making the call.

In a case where the calling party, who is in the process of recording a message in the automatic answering telephone, inserts a DTMF signal in his own message, the sixth embodiment described above functions in such a manner that the incoming-call message is not recorded. Accordingly, at step S104 or S106 in FIG. 20, an arrangement may be adopted in which the prescribed DTMF signal is sent from the facsimile apparatus to the automatic answering telephone 311 so that an incoming message being recorded is disregarded.

A case will be considered in which it is so arranged that the CNG signal is detected by the facsimile apparatus when the automatic answering telephone 311 plays back an answer message in response to an incoming call from the line. In a case where the CNG signal cannot be detected during playback of an answer message and a transition is made to recording of a received message, a prescribed DTMF signal is sent promptly at step S106 if the CNG signal has been detected at step S102 in FIG. 20. The automatic answering telephone 311 which has received the DTMF signal disregards the message being recorded. The recording of the message being recorded is halted immediately and is not counted as an incoming message.

In the sixth embodiment, a case has been described in which a magnetic tape is used as the voice message storing means. However, a semiconductor memory may be employed as in the third embodiment.

In accordance with the sixth embodiment, as described above, in a facsimile apparatus connected to a line together with an automatic answering telephone, use is made of a remote function of the automatic answering telephone to automatically control the automatic answering telephone by the DTMF signal from the facsimile apparatus. As a result, erroneous operation in the automatic answering telephone due to a tone signal, recording or tone signal playback can be prevented without modifying already existing hardware.

Figure 22:
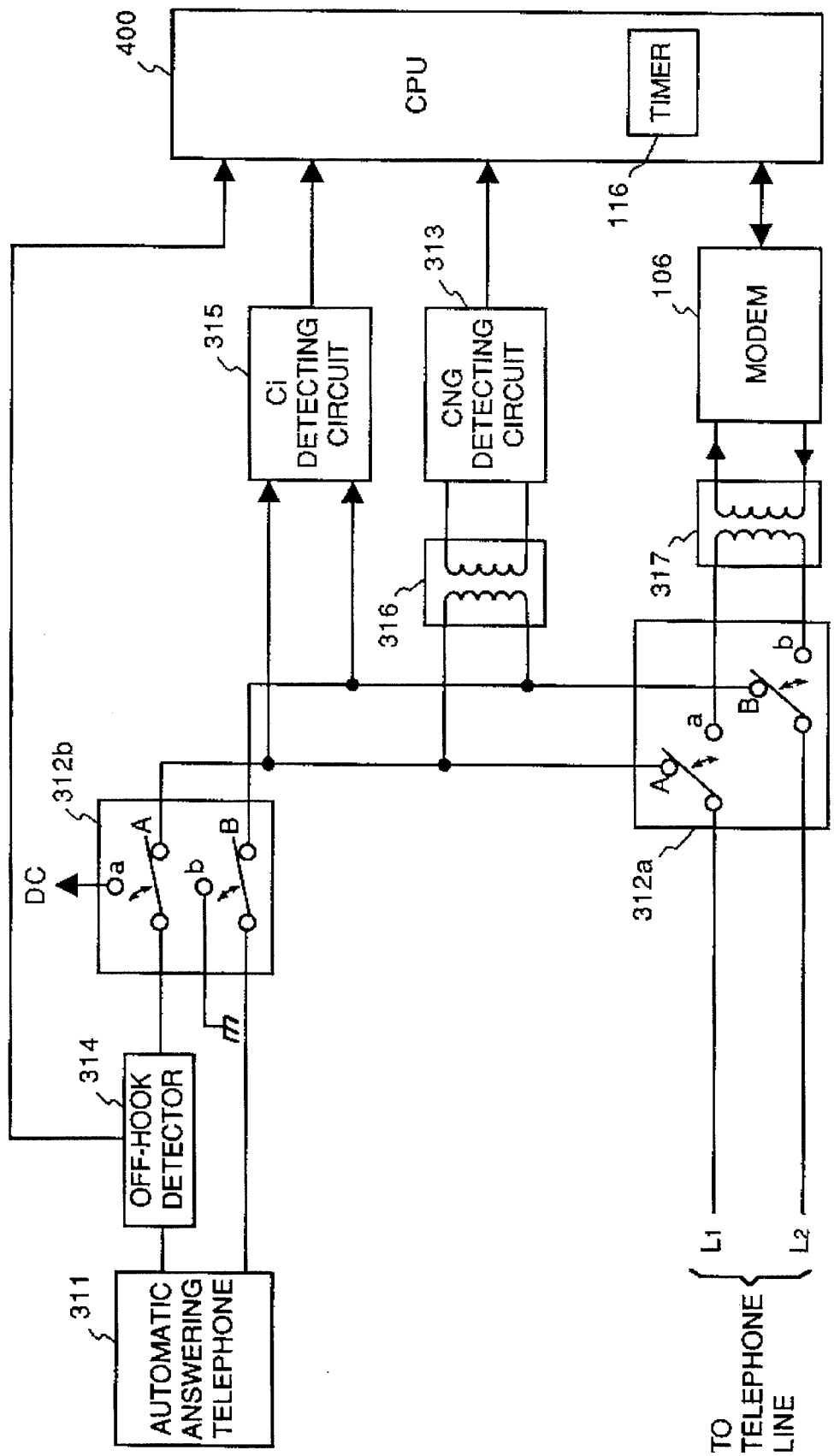
FIG. 22 is a block diagram showing the principal components of a facsimile apparatus according to a seventh embodiment of the invention.

FIG. 22 is a block diagram showing the general construction of an NCU line controller in a facsimile apparatus according to a seventh embodiment of the invention. Portions corresponding to those in FIG. 19 showing the sixth embodiment are designated by like reference numerals.

In FIG. 22, numeral 312a denotes a CML relay, 312b denotes an H relay for applying a voltage necessary for the automatic answering telephone 311 to hold the line, 315 denotes the CI detecting (call-signal detecting) circuit for detecting the call signal (CI), 316 denotes the audio transformer, 317 denotes the hybrid transformer, and 400 denotes a CPU (constituted by a microcomputer, ROM and RAM, etc.) which controls the apparatus.

Figure 23:
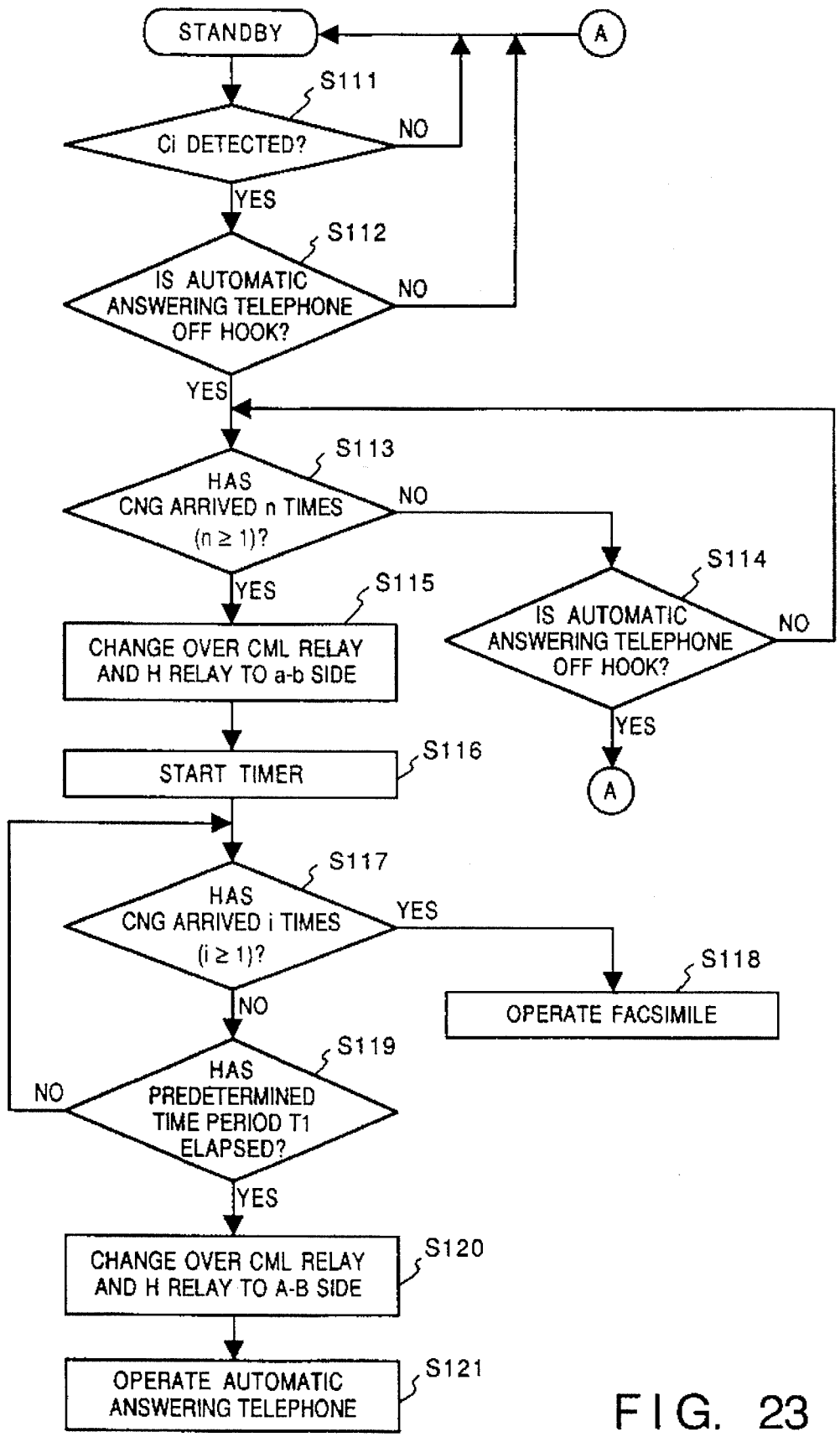
FIG. 23 is a flowchart showing the control operation of a CPU when a call is received in the seventh embodiment.

FIG. 23 is a flowchart illustrating the control operation of the CPU 400 for a case in which a call is received in the facsimile apparatus of the seventh embodiment.

The operation of this embodiment will be described in accordance with the flowchart of FIG. 23.

Figure 27:
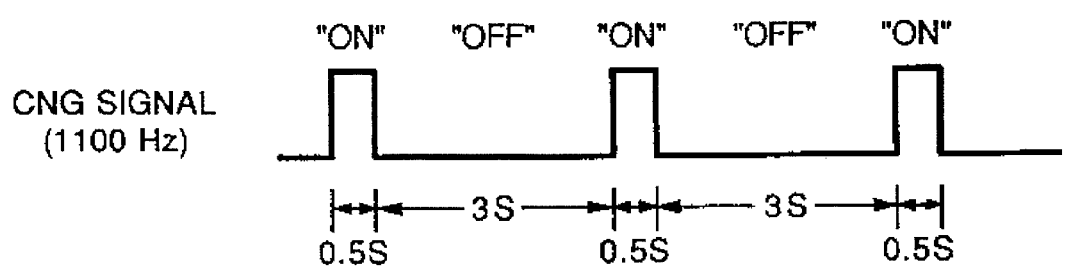
FIG. 27 is a diagram showing an example of timing of the CNG signal.

First, at step S111, when the CI signal from line L1—L1 is detected by the CI detecting circuit 15 to detect an incoming call, the program proceeds to step S112, at which it is determined whether the automatic answering telephone 311 is off the hook. When the automatic answering telephone 311 is taken off the hook, the program proceeds to step S113, at which the facsimile apparatus detects the CNG signal using the CNG detecting circuit 315. If the CNG signal cannot be detected a predetermined number of times n (n≧1) at step S113, the program proceeds to step S114, at which detection of the CNG signal is continued until the automatic answering telephone 311 is hung up. In a case where the CNG signal is capable of being detected the predetermined number of times n (n≧1), the program proceeds to step S115. Here the CML relay 312a and the H relay 312b are changed over to the a–b, a–b sides, respectively, so that timekeeping by the timer 116 is started. FIG. 27 is a diagram showing the timing of the CNG signal.

Next, the program proceeds to step S117, at which a frequency detecting circuit contained in the modem 106 is used to determine whether the CNG signal has been detected a predetermined number of times i (i≧1). In a case where the CNG signal is capable of being detected the predetermined number of times i (i≧1), it is judged that the CNG signal is being sent from the facsimile apparatus and the program proceeds to step S118, at which the facsimile reception operation is started.

If, at step S119, the CNG signal has not been detected the predetermined number of times i (i≧1), then the program proceeds to step S120. Here the CML relay 312a and the H relay 312b are changed over to the A–B, A–B sides, respectively, so that a return is effected to the operation of the automatic answering telephone 311 at step S121.

In the above-described embodiment, detection of the CNG signal using the CNG detecting circuit 313 is capable of being carried out by the modem 106 as well. An arrangement for such a case is as shown in FIG. 24.

Figure 24:
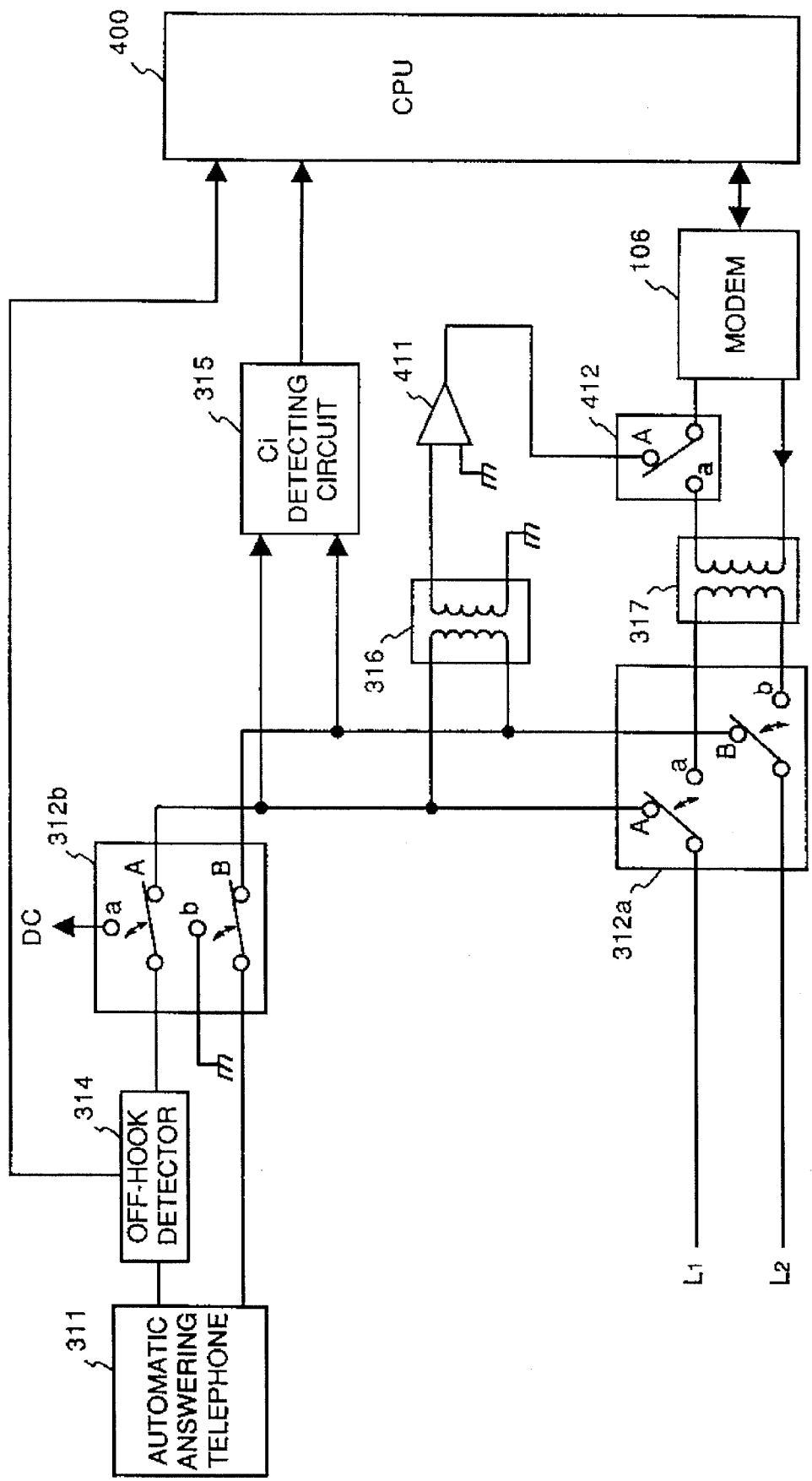
FIG. 24 is a block diagram showing the principal components of a facsimile apparatus in a case where detection of a CNG signal is performed by a modem in the seventh embodiment.

In FIG. 24, numeral 411 denotes an amplifier, and number 412 designates a CNG relay for changing over the path through which the CNG is detected. Control of the CNG relay 412 is such that changeover is to the a side at step S115 and to the A side at step S120 in the flowchart of FIG. 23.

The CNG relay 412 of FIG. 24 may be constituted by an analog switch SW or the like.

Figure 25:
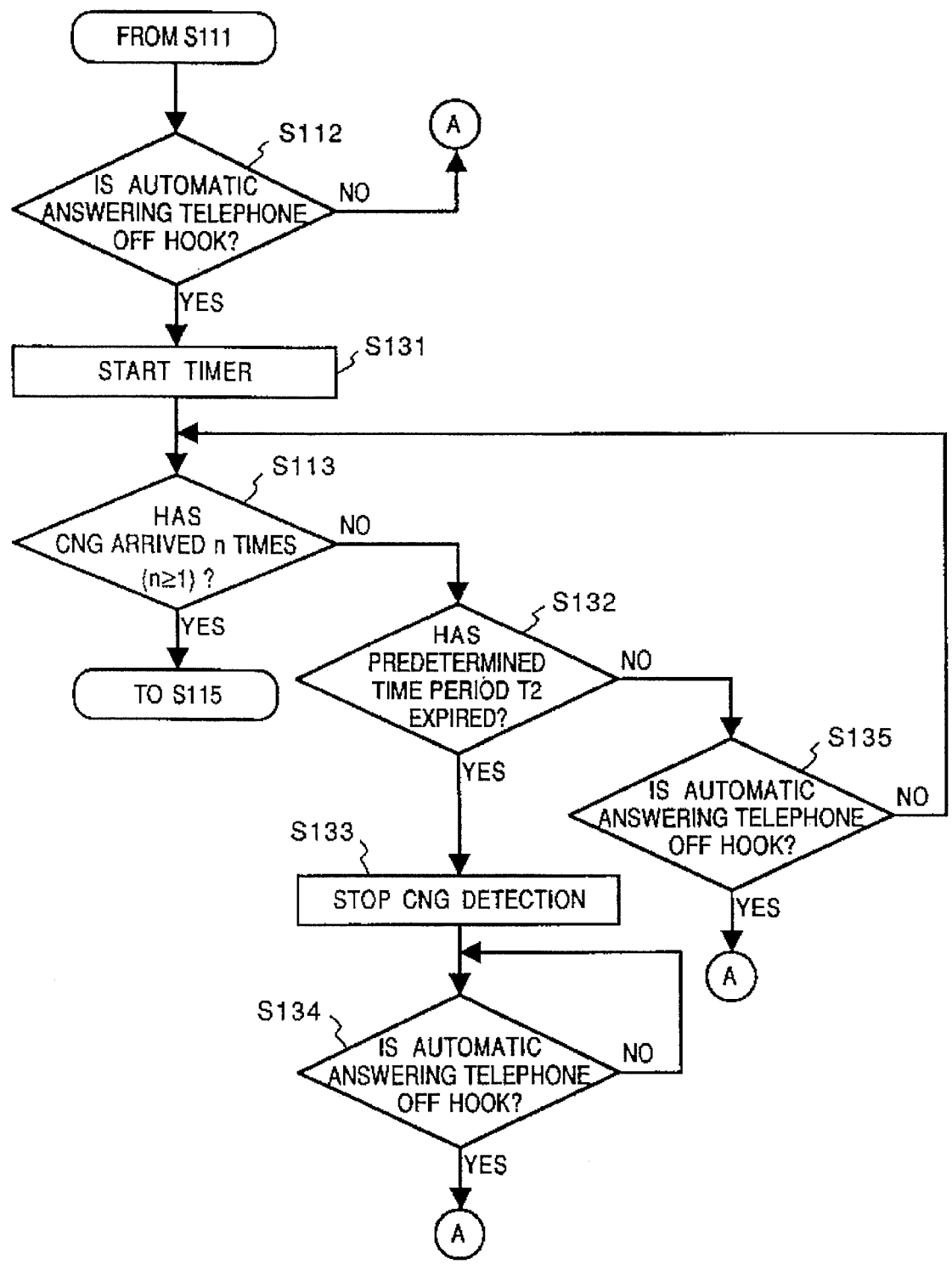
FIG. 25 is a flowchart illustrating the operation of a CPU in the case of FIG. 24.

Further, the steps S112, S113 in the flowchart of FIG. 23 may be arranged as shown in the flowchart of FIG. 25.

In FIG. 25, timekeeping by the timer 116 is started at step S131 in order to measure a predetermined time period T2 in a case where the automatic answering telephone 311 has been taken off the hook at step S112. The CNG signal is then detected at step S113. In a case where the CNG signal cannot be detected the predetermined number of times n (n≧1), the program proceeds to step S132, at which it is determined whether the predetermined time period T2 has ended. If the predetermined time period T2 has not elapsed, the program proceeds to step S135, at which it is determined whether the automatic answering telephone 311 is on the hook. If the automatic answering telephone is on the hook, the program returns to step S113 and detection of the CNG signal is carried out. If the telephone is found to be off the hook at step S135, the program returns to standby (S111).

If the predetermined time period T2 elapses at step S132, the program proceeds to step S133, where the detection of the CNG signal is halted. Thereafter, the program proceeds to step S134, at which the system waits for the automatic answering telephone 311 to be hung up.

Figure 26:
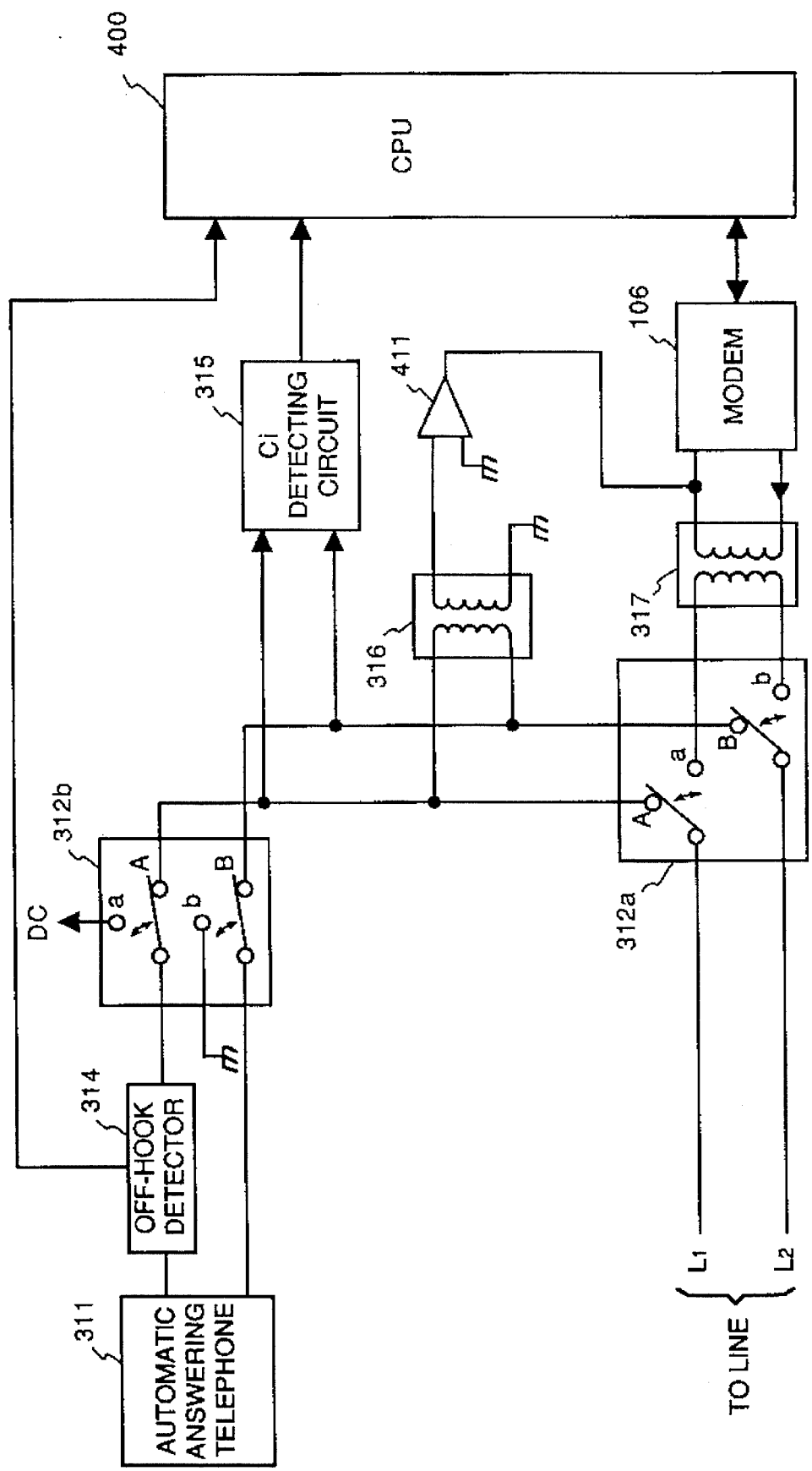
FIG. 26 is a block diagram showing the principal components of a facsimile apparatus which is a modification wherein detection of the CNG signal is performed by a modem in the seventh embodiment.

It is possible to eliminate the means, such as the CNG relay 412, which changes over the CNG detection path in FIG. 24. An example of such an arrangement is illustrated in FIG. 26.

In the foregoing embodiment, the determination as to whether the called item is the facsimile or the telephone is made based upon the CNG signal. However, an arrangement may be adopted in which an FC signal (1300 Hz), which is a call signal from a facsimile network, also is detected.

In accordance with the seventh embodiment, as described above, the line is changed over to the facsimile side after detection of the CNG signal has been performed a predetermined number of times n (n≧1). Thereafter, when detection of CNG has been performed a predetermined number of times i (i≧1), the facsimile reception operation is started. When the detection of CNG has not been performed the predetermined number of times i (i≧1), the line is returned to the automatic answering telephone 311. As a result, a smoother changeover between the automatic answering telephone 311 and the facsimile can be carried out and the performance of a man-machine interface can be improved.

A facsimile apparatus according to an eighth embodiment of the invention will now be described with reference to FIG. 28. In this embodiment, a filter for removing the signal band of a signal corresponding to a tone signal is provided, the CNG is prevented from being stored in the automatic answering telephone.

Figure 28:
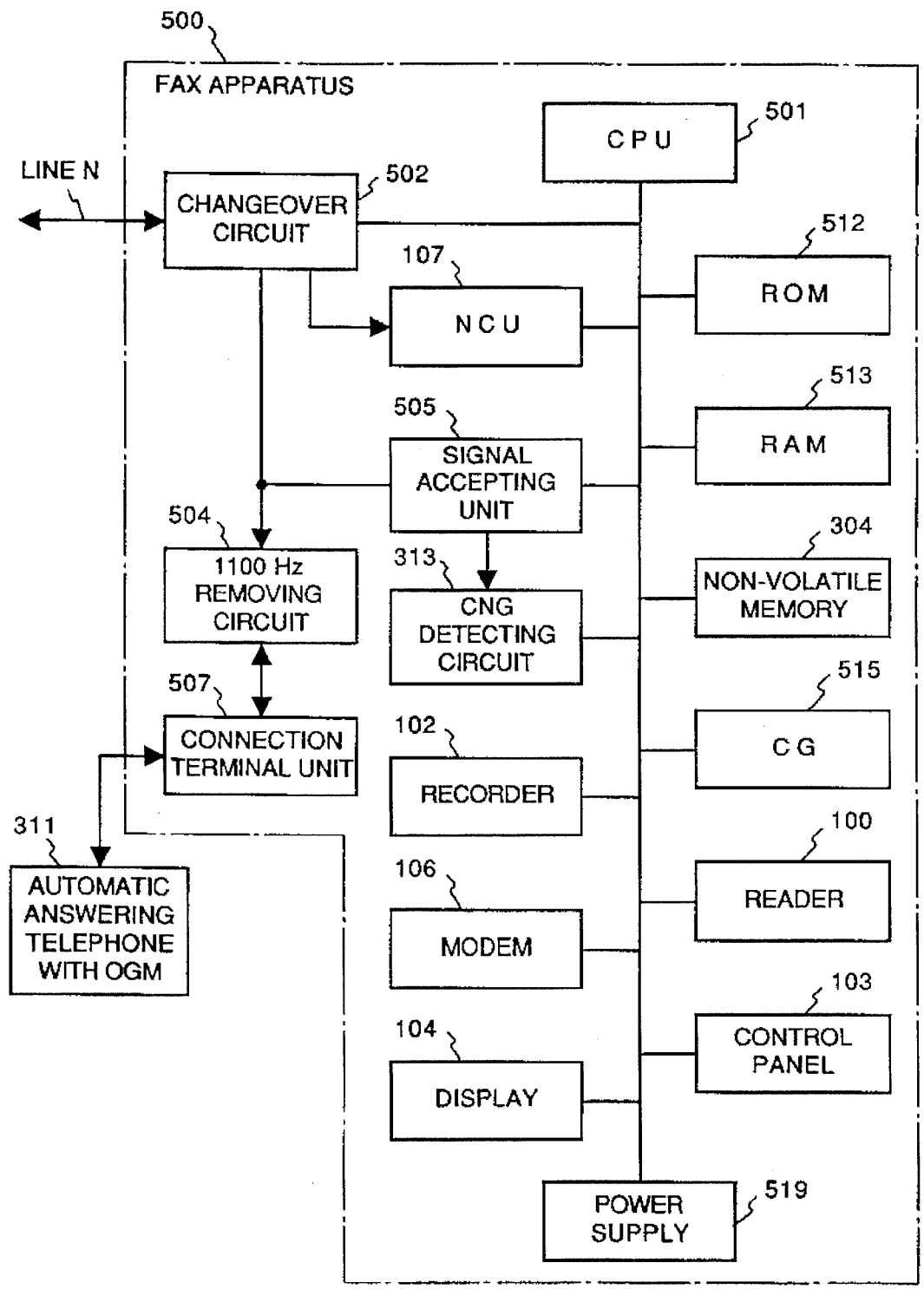
FIG. 28 is a block diagram showing the construction of a facsimile apparatus according to an eighth embodiment of the invention.

FIG. 28 is a block diagram showing the general construction of the facsimile apparatus according to the eighth embodiment. Portions corresponding to those in the foregoing drawings are designated by like reference numerals and need not be described again.

A facsimile apparatus 500 according to this embodiment is equipped with a changeover circuit 502, an NCU 107, an 1100 Hz removing circuit 504, a signal accepting unit 505, a CNG detecting circuit 313, and a connection terminal unit 507, etc. The automatic answering telephone 311, which is equipped with an OGM, is connected to the connection terminal unit 507.

The changeover circuit (CML relay) 502 selectively changes the telephone line N over to the side of the NCU 107 or the side of the 1100 Hz removing circuit 504 of the facsimile apparatus 500. The NCU 107 connects the line N to the modem 106 via the changeover circuit 502 in response to changeover of the CML relay. The 1100 Hz removing circuit 504 eliminates the 1100 Hz frequency components from an OGM signal sent from the automatic answering telephone 311 to the line N via the connection terminal unit 507. The signal accepting unit 505, which is located on the input side of the 1100 Hz removing circuit 504, receives the signal from the line N as an input and outputs this signal to the CNG detecting circuit 313. The latter detects the 1100 Hz signal from the line N, regarding this signal as the CNG signal.

In the ordinary state, such as the standby state, the changeover circuit 502 connects the line N to the 1100 Hz removing circuit 504. As a result, the line N ordinarily is connected to the signal accepting unit 505 and the terminal connection unit 507 via the 1100 Hz removing circuit 504, and the line is connected to the automatic answering telephone 311 by the connection terminal unit 507.

The CPU 501 is constituted by a microprocessor or the like and controls the overall facsimile apparatus in accordance with a program stored in a ROM 512. A RAM 513 stores binarized image data read by the reader 100, binarized image data recorded by the recorder 102, binarized image data for transmission modulated by the modem 106, and binarized image data received from the outside and demodulated by the modem 106. A CG (character generator) 515, which is a ROM for storing character patterns such as JIS codes and ACSII codes, outputs pattern data corresponding to a prescribed character code by being controlled by the CPU 501. Numeral 519 denotes a power supply for supplying power not only to the components of the apparatus 500 but also to the automatic answering telephone 311.

Operation will now be described in detail.

First, in the ordinary state, the line N is connected to the automatic answering telephone 311 through the 1100 Hz removing circuit 504 and the terminal connection unit 507. The CI signal is applied to the automatic answering telephone 311 from the line N. When the CI signal is applied greater than a predetermined number of times, the automatic answering telephone 311 starts, the line N is acquired and the call is established. As a result, the OGM signal is outputted from the automatic answering telephone 311 to the line N and is transmitted to the calling party. After transmission, a transition is made to operation for recording the message from the calling party. Accordingly, in a case where the calling party is a person and not a facsimile apparatus, an ordinary automatic answering operation is performed. The standby state is restored when the call ends.

In a case where the calling party is a facsimile apparatus, the calling facsimile apparatus transmits the CNG signal upon detecting the fact that the automatic answering telephone 311 has acquired the line N. At this time the automatic answering telephone 311 is outputting the OGM signal, and therefore a collision with the CNG signal results on the line N. However, since the OGM signal is outputted to the line N through the 1100 Hz removing circuit 504, the 1100 Hz components are removed.

Accordingly, the CNG signal from the calling apparatus is not interfered with by the OGM signal and is inputted to the CNG detecting circuit 313 from the signal accepting unit 505 via the changeover circuit 502. As a result, the CNG detecting circuit 313 is capable of detecting the CNG signal in appropriate fashion. Owing to detection of the CNG signal, the changeover circuit 502 changes the line N over to the NCU 7 and the line N is connected to the modem 106 via the NCU 107.

At the moment the changeover circuit 502 is changed over to the NCU 107, recording by the automatic answering telephone 311 stops and the original state is restored. When facsimile communication with the calling apparatus ends, the changeover circuit 502 is changed over to the side of the 1100 Hz removing circuit 504 and the standby state is restored.

In the foregoing operation, an arrangement is described in which the automatic answering telephone 311 is externally attached via the connection terminal unit 507. However, the present invention is capable of being similarly applied also to a facsimile apparatus having an internal automatic answering telephone function.

Further, in the foregoing embodiment, the 1100 Hz components of the OGM signal are removed using the 1100 Hz removing circuit 504. However, this circuit may be adapted to remove any frequency components. In addition, the CNG signal detecting circuit 313 may be constituted by a filter which detects the frequency components of the CNG signal.

Figure 29:
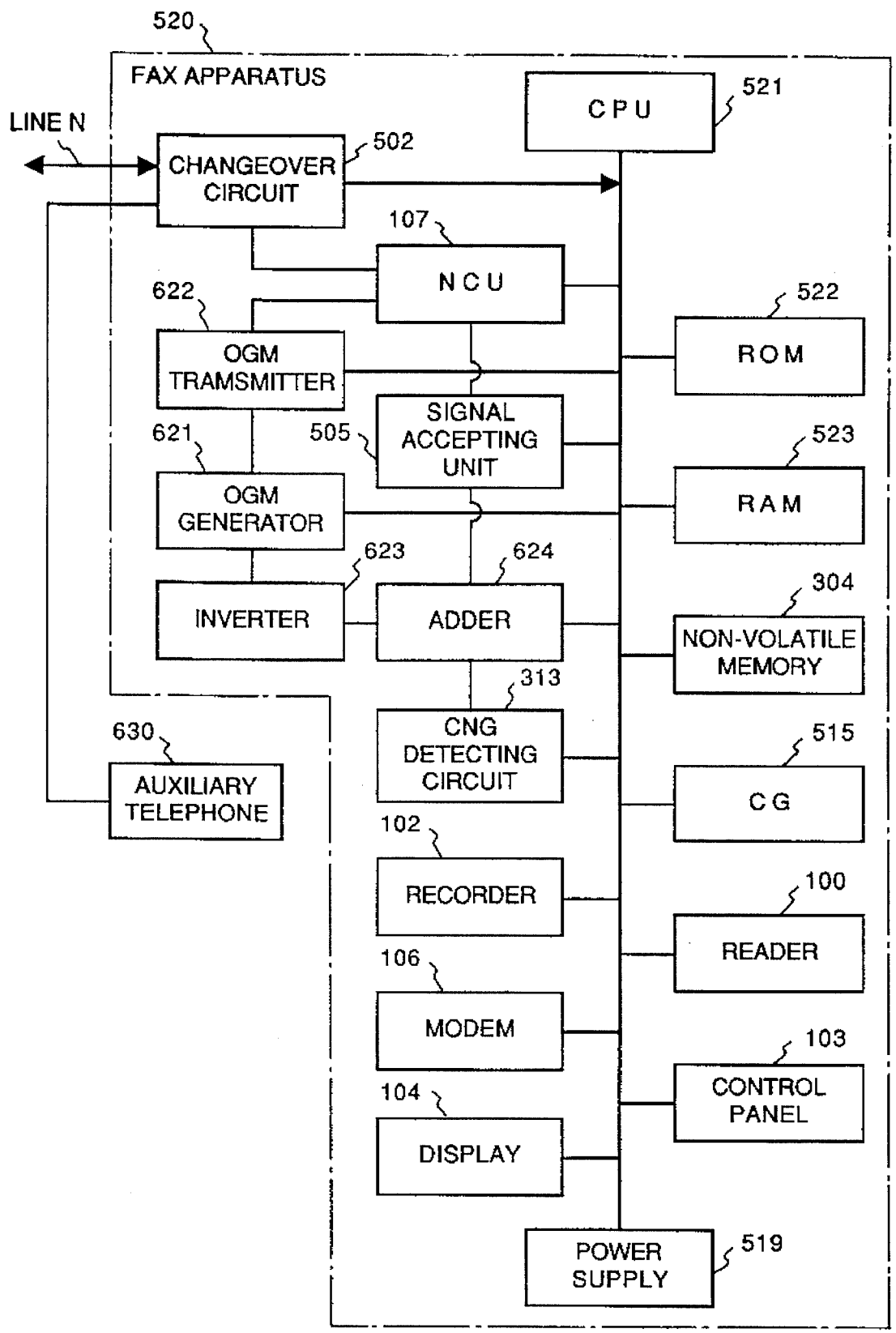
FIG. 29 is a block diagram showing the construction of a facsimile apparatus according to a ninth embodiment of the invention.

FIG. 29 is a block diagram showing the general construction of a facsimile apparatus 520 according to a ninth embodiment of the invention. Portions corresponding to those in the foregoing drawings are designated by like reference numerals and need not be described again.

The facsimile apparatus 520 of this embodiment is internally provided with an arrangement for transmitting OGM, namely an OGM generator 621, an OGM transmitter 622, an inverter 623 and an adder 624, as the automatic answering telephone. The changeover circuit 502 operates so as to selectively connect the line N to the side of the NCU 107 or the side of an auxiliary telephone 630. The NCU 107 operates in such a manner that the line N is selectively connected to the OGM transmitter 622 and to the side of the signal accepting unit 505 or the side of the modem 106 by control of the CML relay.

More specifically, when there is an incoming call in the automatic answering mode, the OGM signal generated by the OGM generator 621 is sent from the OGM transmitter 622 to the line N via the NCU 107 and changeover circuit 502. When the CNG signal is detected by the signal accepting unit 505, the line N is changed over to the side of modem 106 by the NCU 107 and the facsimile communication operation is carried out.

In this embodiment, in order to prevent the detection of the CNG signal from being interfered with by the OGM signal, the OGM signal is inverted by the inverter 623, the inverted signal and the input signal from the signal accepting unit 505 are added and the result is supplied to the CNG detecting circuit 313. As a result, the OGM signal transmitted to the line N and superimposed on the CNG signal can be canceled by the inverted signal and only the necessary CNG signal is capable of being inputted to the CNG detecting circuit 313.

In order to executed the above-described processing, the inverter 623 reverses the polarity of the OGM signal outputted by the OGM generator 621 and outputs the inverted signal to the adder 624. The adder 624 adds the signal from the inverter 623 and the signal from the signal accepting unit 505 and sends the CNG detecting circuit 313 the resulting signal, in which the component of the OGM signal has been canceled. The CNG signal can thus be detected without any hindrance owing to the OGM signal.

In this embodiment, the inverter 623 and the adder 624 are provided separately. However, the inversion and addition can be accomplished by a single unit using an operational amplifier or the like. Further, an arrangement can be adopted in which the automatic answering telephone 311 equipped with the OGM of the eighth embodiment is connected instead of the auxiliary telephone 630 and the OGM signal generated by the automatic answering telephone 311 is inverted and added to the input signal from the line N.

In the foregoing embodiments, frequency detection is possible depending upon the modem used. In such case, therefore, it is possible to apply the output of the adder 624 to the modem 106 directly to detect the CNG signal without using the CNG detecting circuit 313.

In accordance with the eighth and ninth embodiment, as described above, detection of a tone signal for automatic TEL/FAX changeover can be detected properly without influence from transmission of an answer message by an automatic answering telephone. This makes it possible to eliminate the trouble involved in setting a silent state when recording an answer message.

Further, the recording of an unnecessary tone signal by the automatic answering telephone is eliminated, and when it is attempted to listen to the content of a recording by a remote operation from outside the home or office, an inconvenience in which the apparatus operates erroneously owing to playback of the tone signal can be eliminated.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus capable of being connected to a communication terminal which is able to perform predetermined communication in response to an incoming call on a communication line without an operation of the communication terminal being controlled by a control means of said facsimile apparatus, said facsimile apparatus comprising:

facsimile communication means for performing a facsimile communication;

line connecting means for connecting and disconnecting the communication terminal to/from the communication line via said facsimile apparatus;

first detecting means for detecting whether or not a calling party is a facsimile apparatus, in a condition where the communication terminal is connected to the communication line by said line connecting means;

second detecting means for detecting whether or not a received signal contains a control signal for controlling the communication terminal in a condition where the communication terminal is connected to the communication line by said line connecting means;

said control means for causing said line connecting means to disconnect the communication terminal from the communication line and for controlling said facsimile communication means so as to start facsimile communication, in accordance with a detection signal from the first detecting means indicating that the calling party is a facsimile apparatus; and inhibiting means for inhibiting transition to facsimile communication by said control means in a condition where the communication terminal is connected to the communication line by said line connecting means, when the control signal is detected by said second detecting means.

2. The apparatus according to claim 1, wherein said communication terminal is an automatic answering telephone.

3. The apparatus according to claim 1, wherein said second detecting means detects a DTMF signal.

4. The apparatus according to claim 1, wherein said first detecting means detects a signal relating to a facsimile transmission, thereby detecting whether the calling party is a facsimile apparatus.

5. The apparatus according to claim 1, wherein said first detecting means detects whether a silent state has continued for a predetermined period of time, thereby detecting whether the calling party is a facsimile apparatus.

6. A facsimile apparatus according to claim 1, wherein said first detecting means detects a CNG signal.

7. The apparatus according to claim 1, wherein said facsimile communication means includes said first detecting means.

8. A facsimile apparatus according to claim 1, wherein said facsimile communication means includes said second detecting means.

9. A communication method in a facsimile apparatus capable of being connected to a communication terminal which is able to perform predetermined communication in response to an incoming call on a communication line without an operation of the communication terminal being controlled by a control means that controls the facsimile apparatus, which includes a switch for selectively connecting the communication line to either a facsimile modem or the communication terminal which performs predetermined communication, said method comprising the steps of:

detecting whether or not a calling party is a facsimile apparatus and whether or not a control signal for controlling the communication terminal is contained in a received signal, in a condition where the communication terminal is connected to the communication line;

performing facsimile communication in a condition where the communication terminal is disconnected from the communication line, in a case where the calling party is a facsimile apparatus; and inhibiting execution of said performing step when the control signal is detected.

10. A communication method according to claim 9, wherein, in said detecting step, a detection is made that the calling party is a facsimile apparatus based on a CNG signal.

11. A communication method according to claim 9, wherein said control signal includes a DTMF signal.

12. A communication method according to claim 9, wherein, in said detecting step, a detection is made that the calling party is a facsimile apparatus based on a silent signal.

13. A communication method according to claim 9, wherein, in said detecting step, the control signal detected is a control signal which controls an answering telephone included in the communication terminal.

14. A communication method according to claim 9, wherein, in said detecting step, a detection is made that the calling party is a facsimile apparatus using a modem.

15. A communication method according to claim 9, wherein, in said detecting step, a detection is made of the control signal by using a modem.

16. A communication apparatus capable of being connected to a communication terminal which is able to perform predetermined communication without an operation of the communication terminal being controlled by a control means of said communication apparatus in accordance with an incoming call and a control signal on a communication line, said communication apparatus comprising:

data communication means for data communication;

line connecting means for connecting and disconnecting the communication terminal to/from the communication line via said communication apparatus;

detecting means for detecting a data communication request and the control signal while the communication terminal is connected to the communication line by said line connecting means; and said control means for causing said line connecting means to disconnect the communication terminal from the communication line and for causing said data communication means to perform data communication in accordance with the detection of the data communication request, or for holding said line connecting means in accordance with the detection of the control signal so as to connect the communication terminal to the communication line.

17. A communication apparatus according to claim 16, wherein the communication terminal includes an automatic answering telephone.

18. A communication apparatus according to claim 16, wherein the control signal includes a DTMF signal.

19. A communication apparatus according to claim 16, wherein the data communication request includes a CNG signal.

20. A communication apparatus according to claim 16, wherein the data communication means includes said detecting means.

21. A data communication apparatus capable of being connected to a communication terminal which is able to perform predetermined communication without an operation of the communication terminal being controlled by a control means of said data communication apparatus in accordance with an incoming call and a control signal on a communication line, said data communication apparatus comprising:

data communication means for data communication;

line connecting means for connecting and disconnecting the communication terminal to/from the communication line via said communication apparatus;

first detecting means for detecting a silent state of an incoming signal in a condition where the communication terminal is connected to the communication line by said line connecting means;

second detecting means for detecting the control signal to the communication terminal in a condition where the communication terminal is connected to the communication line by said line connecting means; and said control means for causing said line connecting means to disconnect the communication terminal from the communication line and for causing said data communication means to perform data communication in accordance with the detection of the silent state by said first detecting means, or for holding said line connecting means in accordance with the detection of the control signal, in a condition where the communication terminal is connected to the communication line by said line connecting means, so as to connect the communication terminal to the communication line.

22. A data communication apparatus according to claim 21, wherein the communication terminal includes an automatic answering telephone.

23. A data communication apparatus according to claim 21, wherein the control signal includes a DTMF signal.

24. A switching method for a switch to connect a communication line to a data communication unit or a communication terminal which is able to perform predetermined communication without an operation of the communication terminal being controlled by a control means that controls the data communication unit in accordance with an incoming call and a control signal on the communication line, said method comprising the steps of:

detecting a data communication request and the control signal on the communication line when the switch connects the communication line to the communication terminal;

changing over the switch so as to connect the communication line to the data communication unit in accordance with a detection of the data communication request before the control signal, when an incoming call is detected on the communication line; and holding the switch so as not to connect the communication line to the data communication unit in a case where the control signal is detected before the data communication request, when the incoming call is detected on the communication line.

25. A switching method according to claim 24, wherein the communication terminal connected to the communication line by the switch includes an automatic answering telephone.

26. A switching method according to claim 24, wherein the control signal detected in said detecting step includes a DTMF signal.

27. A switching method according to claim 24, wherein the data communication request detected in said detecting step includes a CNG signal.

28. A switching method according to claim 24, wherein the data communication request or the control signal is detected in said detecting step by using the data communication unit.

29. A switching method according to claim 24, wherein the data communication unit connected to the communication line in said changing over step performs facsimile data communication.

30. A switching method for switching to connect selectively a communication line to either a data communication unit or a communication terminal which is able to perform predetermined communication without an operation of the communication terminal being controlled by a control means that controls the data communication unit in accordance with an incoming call and a control signal on the communication line, said method comprising the steps of:

detecting a silent state and the control signal on the communication line, in a condition where a switch connects the communication line to the communication terminal, when an incoming call is detected on the communication line;

changing over the switch so as to connect the communication line to the data communication unit in a case where the silent state is detected before the control signal, when the incoming call is detected; and holding the switch so as not to connect the communication line to the data communication unit in a case where the control signal is detected before the silent state, when the incoming call is detected on the communication line.

31. A switching method according to claim 30, wherein the communication terminal connected to the communication line by the switch includes an automatic answering telephone.

32. A switching method according to claim 30, wherein the control signal detected in said detecting step includes a DTMF signal.

33. A switching method according to claim 30, wherein the data communication unit connected to the communication line in said changing over step performs facsimile data communication.

* * * * *

UNITED STATES PATENT AND TRADEMARK OFFICE
CERTIFICATE OF CORRECTION

PATENT NO. : 5,544,234
DATED : August 6, 1996
INVENTOR(S) : HISAO TERAJIMA

It is certified that error appears in the above-indentified patent and that said Letters Patent is hereby corrected as shown below:

ON THE TITLE PAGE

Item [19],

"Terajima et al." should read --Terajima--

AT  "[75] Inventors: Hisao Terajima, Yokohama;
                       Shigeru Koizumi, Urawa;
                       Toru Nakayama, Yokohama;
                       Tomoyuki Takeda, Yokohama;
                       Hiromichi Uno, Yokohama;
                       Kaori Nakagawa; Hideki Shimizu,
                       both of Kawasaki;
                       Mitsuo Morita, Tokyo,
                       all of Japan"

should read

--[75] Inventor: Hisao Terajima, Yokohama, Japan--

UNITED STATES PATENT AND TRADEMARK OFFICE
CERTIFICATE OF CORRECTION

PATENT NO. : 5,544,234
DATED : August 6, 1996
INVENTOR(S) : HISAO TERAJIMA

It is certified that error appears in the above-indentified patent and that said Letters Patent is hereby corrected as shown below:

<u>IN THE DRAWINGS</u>

<u>AT SHEET 20</u>

"THELEPHONE" (both occurrences) should read --TELEPHONE--
and "THELPHONE," should read --TELEPHONE,--

<u>AT COLUMN 3</u>

Line 32, "means_after" should read --means, after--

<u>AT COLUMN 7</u>

Line 3, "not" should read --no--

<u>AT COLUMN 13</u>

Line 22, "a-prescribed" should read --a prescribed--

UNITED STATES PATENT AND TRADEMARK OFFICE
CERTIFICATE OF CORRECTION

PATENT NO. : 5,544,234
DATED : August 6, 1996
INVENTOR(S) : HISAO TERAJIMA

It is certified that error appears in the above-indentified patent and that said Letters Patent is hereby corrected as shown below:

AT COLUMN 20

Line 64, "executed" should read --execute--

Signed and Sealed this

Twenty-first Day of January, 1997

Attest:

BRUCE LEHMAN

*Attesting Officer*       *Commissioner of Patents and Trademarks*